(12) United States Patent
Laliberté et al.

(10) Patent No.: US 8,732,892 B2
(45) Date of Patent: May 27, 2014

(54) LEAVES COLLECTION SYSTEM FOR USE WITH A PORTABLE BLOWER/VACUUM AND A LID ALLOWING THE REJECTION AND THE RETENTION OF DEBRIS IN A BAG

(76) Inventors: William Laliberté, Québec (CA); Denis Laliberté, Québec (CA)

( * ) Notice: Subject to any disclaimer, the term of this patent is extended or adjusted under 35 U.S.C. 154(b) by 27 days.

(21) Appl. No.: 13/539,322

(22) Filed: Jun. 30, 2012

(65) Prior Publication Data
US 2013/0031740 A1    Feb. 7, 2013

(30) Foreign Application Priority Data

Aug. 4, 2011   (CA) .................................... 2748583

(51) Int. Cl.
*A47L 9/14*     (2006.01)
*A47L 9/10*     (2006.01)

(52) U.S. Cl.
USPC ................................ 15/246.2; 15/247; 15/347

(58) Field of Classification Search
USPC ............. 15/246, 246.2, 312.2, 247, 347, 352, 15/344
See application file for complete search history.

(56) References Cited

U.S. PATENT DOCUMENTS

| | | | | |
|---|---|---|---|---|
| 4,654,926 A * | 4/1987 | McCambridge | ............ | 15/327.6 |
| 4,691,840 A * | 9/1987 | Ferbrache | ..................... | 220/318 |
| 4,713,858 A * | 12/1987 | Kelber | ............................ | 15/347 |
| 4,723,971 A * | 2/1988 | Caldas | ............................ | 96/385 |
| 5,085,340 A * | 2/1992 | Doxey et al. | .................. | 220/298 |
| D326,342 S * | 5/1992 | Doxey et al. | ..................... | D34/7 |
| 5,160,060 A * | 11/1992 | Garofalo, Jr. | ................. | 220/318 |
| 5,163,577 A * | 11/1992 | Lee | ................................ | 220/318 |
| 6,170,118 B1 * | 1/2001 | McIntyre et al. | ........... | 15/327.6 |
| 6,574,829 B1 * | 6/2003 | Marcum et al. | ................. | 15/347 |
| 6,988,293 B2 * | 1/2006 | Ritter | ............................... | 15/347 |
| 7,185,389 B2 * | 3/2007 | Thomason et al. | ......... | 15/246.4 |
| 7,257,858 B2 * | 8/2007 | Palazzolo | ........................ | 15/347 |
| 7,341,612 B2 * | 3/2008 | Nhan et al. | ..................... | 55/373 |
| 7,506,403 B2 * | 3/2009 | Svoboda et al. | ................ | 15/347 |
| 7,587,785 B2 * | 9/2009 | Arner | ........................... | 15/327.5 |
| 7,752,706 B2 * | 7/2010 | Goodger | ...................... | 15/327.4 |
| 7,917,992 B2 * | 4/2011 | McIntyre | ...................... | 15/327.1 |
| 7,962,996 B1 * | 6/2011 | Mondello | ........................ | 15/347 |
| 2007/0226945 A1 * | 10/2007 | McIntyre | ...................... | 15/327.6 |

* cited by examiner

*Primary Examiner* — Dung Van Nguyen

(57) ABSTRACT

A leaves collection system for use with a portable blower/vacuum in the vacuum mode with a lid allowing the rejection of debris in a plastic or paper bag. The lid (of round shape with a lateral groove) has three main openings, one for the entrance of debris and two for the outlet of air as well as holes to attach the various elements to the lid with cable ties. The lid is inserted into the opening of the bag and the bag is held in place on the lateral edge of the lid by a bungee cord in the groove. Ribbed pipe connects the fan outlet of the blower/vacuum to the lid and sends debris towards the lid and the bag. A membrane under the bag protects the bag from the roughness of the ground.

28 Claims, 25 Drawing Sheets

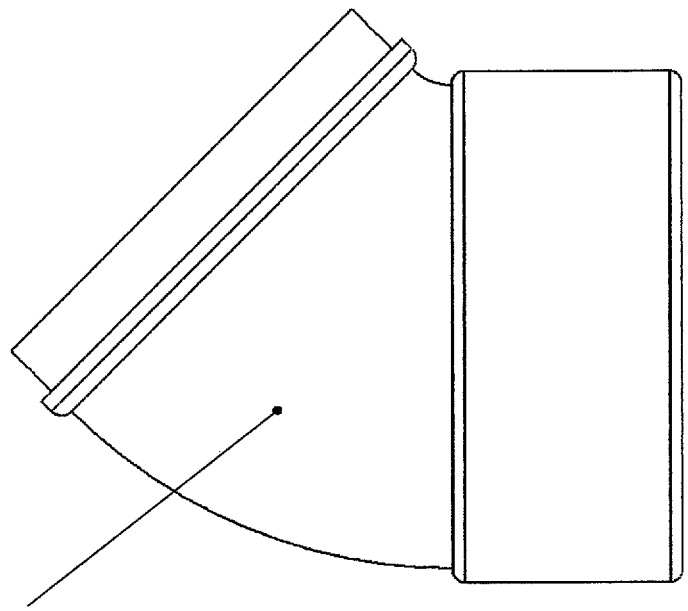
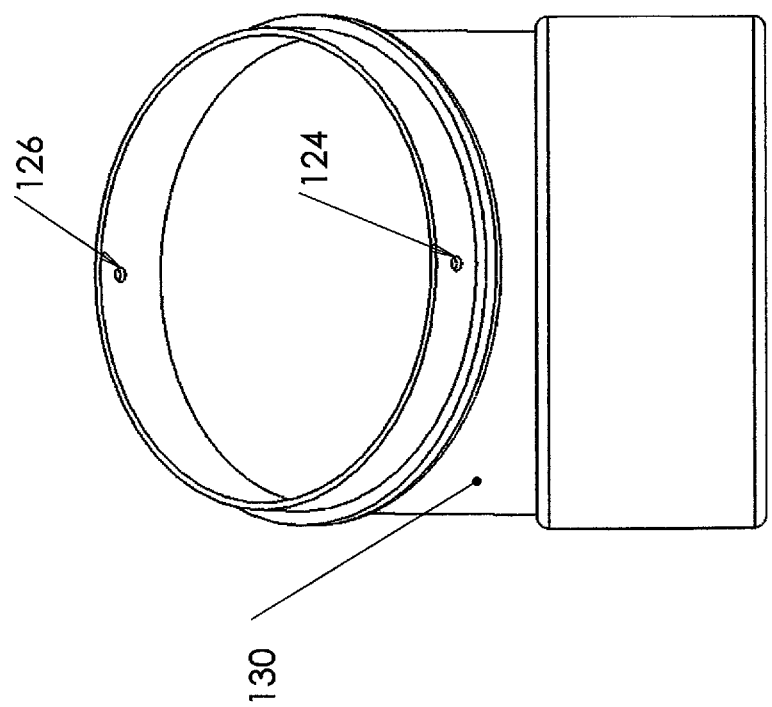
FIG. 17

LEAVES COLLECTION SYSTEM FOR USE WITH A PORTABLE BLOWER/VACUUM AND A LID ALLOWING THE REJECTION AND THE RETENTION OF DEBRIS IN A BAG

TECHNICAL FIELD

The present invention relates to a leaves collection system for use with a portable blower/vacuum in vacuum mode for the aspiration and the shredding of leaves and other lawn debris and the rejection of debris into a debris collection bag.

BACKGROUND OF THE INVENTION

The blower/vacuums are well known in lawn and garden implement which are used for blowing or picking up various debris, such as leaves and grass clippings. A typical blower/vacuum in suction mode comprises a housing that encloses an electric motor having a rotatable shaft on which is connected a fan placed in a housing. During the rotation of the motor, the fan mounted on the shaft rotates and creates a suction which draws the leaves and other lawn debris into the fan inlet where they are shredded and then ejected from the fan outlet. A handle is provided on the housing to allow the user to hold and direct the inlet of the blower/vacuum. In the mode normally used, the blower/vacuum rejects debris in a small collection bag coupled directly to the fan outlet of the blower/vacuum. The user wears on his shoulder the debris collection bag with a belt attached to the bag. The weight of the debris that accumulates in the bag creates in time some fatigue at the user. When the collection bag is full, the user disconnects the collection bag from the fan outlet of the blower/vacuum, unzips a zipper provided in the bag, and then dumps the debris out of the bags into a larger disposable bag to collect debris, a trash can or a place for decomposing debris. The user can then close the collection bag with the zipper, connects it to the blower/vacuum and continue to collect debris. This type of debris collection bag, although effective for collecting small amounts of debris, quickly becomes limiting for the collection of large amounts of debris. It must frequently be emptied what becomes tedious and slows significantly the work of the user. In addition to the weight of the bag and debris, the bag being suspended from the user's body, the dust emitted by the air output through the bag pores can be annoying to users.

Other debris collection systems were invented to correct problems of the conventional system described above. U.S. Pat. No. 7,506,403 B2 has a collection bag in a cart with wheels, the bag must be emptied when full and the system is designed for one type of bag. The user also has the disadvantage to pull a wagon wheel with the bag of debris. U.S. Pat. No. 7,587,785 B2, the user wears on his back the receptacle to collect the debris and debris must be emptied in a bag for disposal. For the U.S. Pat. No. 6,988,293 B2, leaves are collected directly in a bag with slots to the air outlet, the bag is disposable which eliminates the need to pour the debris and the bag is designed specifically for the system. The bag is attached to the blower/vacuum and the weight of the bag and debris is carried by the user. It is not possible to use a wide variety of bags to collect debris which limits the choice of supplier. The bag is of small dimensions compared to the collection bag for lawn debris. For U.S. Pat. Nos. 7,962,996 B1, 7,917,992 B2 and 7,752,706 B2, the debris are collected in a large collection bag inserted into a large solid container mounted on a cart. The cart can be moved and carries the weight of debris. This system is relatively heavy and large. It can be cumbersome to move over rough terrain. The user must move the cart as the work progresses. For U.S. Pat. Nos. 7,257,858 B2, 6,574,829 B1 and 4,713,858, the debris collection system is maintained by a support frame made of metal or a metal container. Debris are collected in a large bag. These systems are fixed and the leaves must be near the system to be collected. The user cannot easily move the system in use. For U.S. Pat. Nos. 7,341,612 B2, 7,185,389 B2 and 4,723,971, the debris are sucked into a small bag or into a rigid container without being shredded first requiring much more space for storage. In addition, the materials must be small as dust or sawdust, and it is little suitable for collection of whole leaves. The system moves on casters or wheels which can pose a problem when the ground is uneven. A single bag model can be used. Accordingly, it is necessary in the art of collecting debris to have a debris collection system allowing both the user mobility and the collection of large amounts of debris without having to pour debris in another bag or requiring the user to carry the bag of debris. Similarly, it is also necessary to have a versatile system that can use a wide variety of bags sold by different companies for the collection of debris to reduce the cost of buying bags and therefore storage costs of debris.

In the art of debris collection, the debris are usually kept in bags placed in metal containers or plastic which is covered with a lid to prevent odors or protect them from weather. These lids are often round in shape and slightly curved. These lids are designed to be watertight and airtight for the needs they are intended. One of these types of lid has a groove on the side wall. U.S. Pat. Nos. 4,691,840, 5,163,577, 5,085,340, 5,160,060, U.S. Des. 326,342 and CA 2542229 refer to this type of lid. These lids do not have a top opening, which removes the possibility of inserting debris into containers or bags inside the containers other than removing the container lid.

Accordingly, as this type of lid round in shape and having both a groove on the side wall, openings for the air outlet and an opening for the discharge of lawn debris directly into a collecting bag using a blower/vacuum in suction mode, does not exist, it is necessary to have a lid of this type adapted to this need. Creating openings on existing lids is also of interest. The usefulness of the groove on the side wall of the lid is to maintain the bag around the lid.

This is to meet these needs was invented the leaves collection system and lawn debris shown below.

SUMMARY OF THE INVENTION

This leave's debris collection system is based on the use of a portable blower/vacuum for the aspiration, the shredding and the rejection of leaves debris in a plastic bag, paper or other materials of standard dimension for the collection of leaves. The crushed leaves by the blower/vacuum in suction mode are sent in a ribbed connecting pipe of which one end is attached to the fan outlet of the blower/vacuum and the other end to a plastic elbow crossing throughout a lid of round shape with a flat or slightly domed top. The lid is inserted into the opening of a bag for the collection of leaves and the lid top is oriented perpendicularly to the walls of the bag. The circumference of the lid is approximately the same than the bag when it is opened to be filled. The lid has on its lateral side a 360 degree groove all around the lid on which is fixed at the bottom an anti-skid tape. The opened plastic bag is hold in place at the level of the groove around the lid with an anti-skid tape and a bungee cord placed over the bag and the groove in the lid. The air and crushed leaves that enters by the plastic elbow are directed by a second elbow between two strainers attached on the inside face of the lid. The strainers are used to cover two openings made in the lid allowing to the entering air to escape from the bag and to retain the crushed leaves inside the bag. Two straight pipes or two elbows having an angle about 45 degree are placed on the outside face of the lid into the openings of air outlet to direct air perpendicularly to the lid or towards the ground far from the operator.

A very important advantage of the system is that when the bag is full, it only remains to remove the bungee cord, remove the lid from the opening of the bag and close the bag. Leaves do not need to be transfer into another bag. Leaves debris are directly taken in the collection bag.

Another advantage is that to increase the quantity of leaves debris being able to be put in the bag, it just needs to stop the blower/vacuum and presses on the outside of the bag to compress the debris. The collection of debris can continue by starting the blower/vacuum until the bag is full.

Another advantage of the system is that the operator does not have to carry the weight of the bag of his shoulder; the bag can slip easily on the grass during the movement of the operator.

Another advantage is that the ribbed coupling pipe holding the connecting ribbed pipe to the lid is enough resistant to keep in place the ribbed connecting pipe to the lid to allow to move the bag, but also for allowing the lateral mobility of the lid at the level of the ribbed coupling pipe. This allows adjusting the position of the bag and of the debris entrance and the air outlets with regard to the ground and to the operator.

Another advantage is that several types of bag of standard dimension can be used to collect the debris. Bags can be made of plastic or not or still in recyclable material such as paper if they can fit on the lid shape.

Another advantage is that the collection system is designed to be used with several models of blower/vacuum sold commercially. The poly tubing coupling sleeve which hold the fan outlet of the blower/vacuum to the entrance of the ribbed connecting pipe adapts itself easily over the fan outlet.

Another advantage is that the bag can be easily and quickly interchanged when they are full.

Another advantage is that the lid shape protects the walls of the collection bag and the operator of the debris which quickly enter in collection bag.

Another advantage of the system is that the debris collection bag is protected under itself by a plastic membrane or other material which facilitates the movement of the bag on grounds having roughness without having to care to break the bag during its movement

BRIEF DESCRIPTION OF THE DRAWINGS

This invention will be described in more detail in the following description taken in conjunction with the following drawings, wherein the same reference numbers indicate identical elements throughout.

FIG. 17 is a perspective view of a part of the debris collection system of FIG. 1, particularly illustrating the design of another type of elbow inserted into the lid to direct the air outlet toward the ground.

DETAILED DESCRIPTION OF THE PREFERRED EMBODIMENTS

This invention comprises a debris collection system 2 for use with a portable blower/vacuum 7 used in vacuum mode. In the vacuum mode, the rigid tube 4 is coupled to the input of the fan of the blower/vacuum 7. When the blower/vacuum is running, the vacuum created by the rotation of the fan sucks the debris on the ground, such as leaves, twigs, grass, etc., in the blower/vacuum 7 where they are crushed and thrown by the fan through the fan outlet of the blower/vacuum.

The blower/vacuums are widely used for lawn work and are sold commercially by various companies. The present invention is designed to fit these devices without the need to modify the products sold commercially. Therefore, these devices will not be described in more details.

Figure 1:
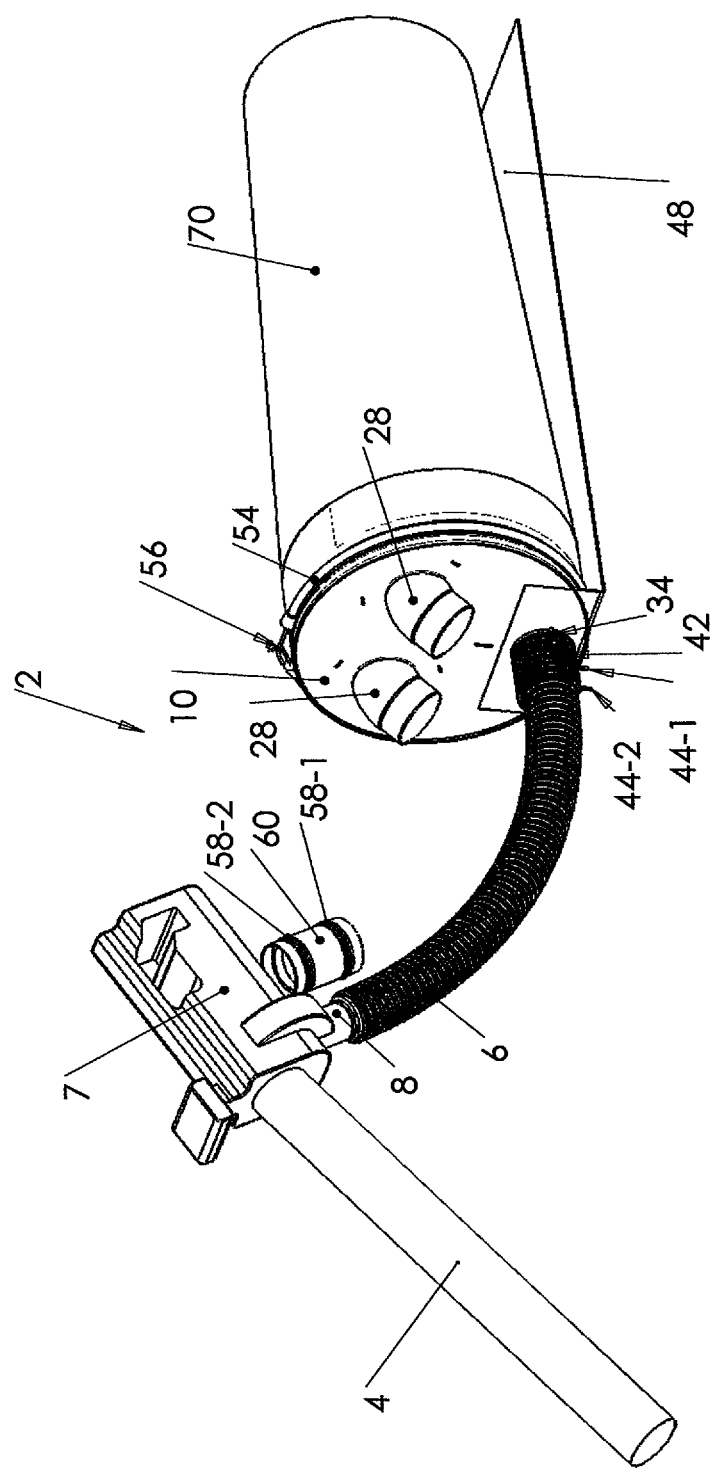
FIG. 1 is a perspective view of the debris collection system according to a first preferred embodiment of the invention comprising a ribbed connecting pipe, the lid with two elbows and various design elements and the collection bag with the protective membrane, particularly illustrating the debris collection system in its assembled form, which is connected to the fan outlet of a blower/vacuum.

FIG. 1 presents an overview of the first preferred embodiment of the debris collection system 2 of the present invention, including the vacuum tube 4 and the fan outlet 8 of the blower/vacuum 7, the Poly Tubing coupling sleeve 60, the ribbed connecting pipe 6, the ribbed pipe coupling 42, the cable ties 44-1 and 44-2 surrounding the ribbed pipe coupling 42, the cable ties 34 holding the ribbed pipe coupling 42 to the lid, the lid 10 with both elbows 28 for the air outlet, the bungee cord 54 and the hooks 56 to hold the bag 70 around the lid 10 and the protective membrane 48. Each component will be described in detail below.

Figure 2:
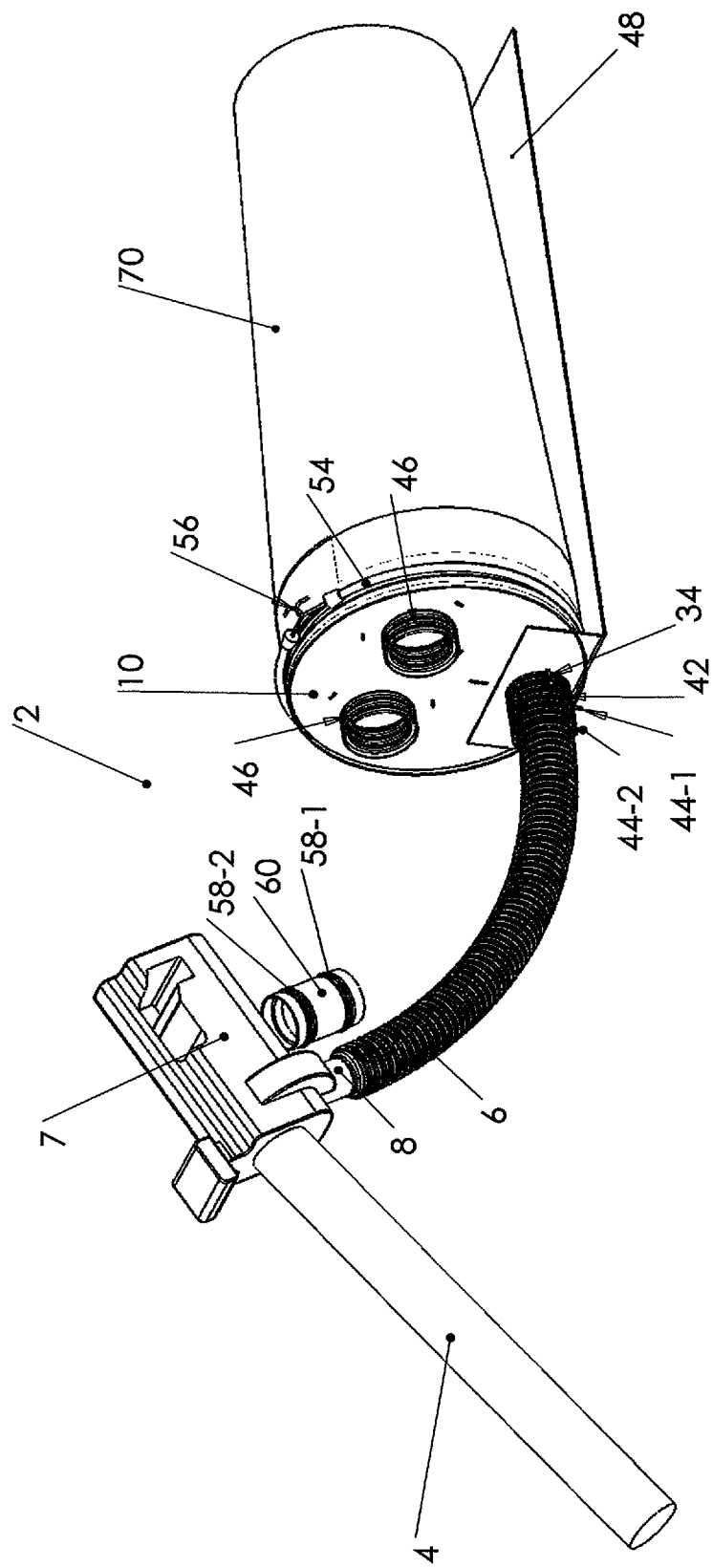
FIG. 2 is a perspective view of the debris collection system according to a second preferred embodiment of the invention comprising a ribbed connecting pipe, the lid with two straight ribbed pipes and various design elements as well as the collecting bag with the protective membrane, particularly illustrating the debris collection system in its assembled form, which is connected to the fan outlet of a blower/vacuum.

FIG. 2 presents an overview of the second preferred embodiment of the debris collection system 2 of the present invention, including the vacuum tube 4 and the fan outlet 8 of the blower/vacuum 7, the Poly Tubing coupling sleeve 60, the ribbed connecting pipe 6, the ribbed pipe coupling 42, the cable ties 44-1 and 44-2 surrounding the ribbed pipe coupling 42, the cable ties 34 holding the ribbed pipe coupling 42 to the lid 10, the lid 10 with, in this variant, two ribbed pipe 46 for the air outlet, the bungee cord 54 and the hooks 56 to hold the bag 70 around the lid 10 and the protective membrane 48. Each component will be described in detail below.

Figure 3:
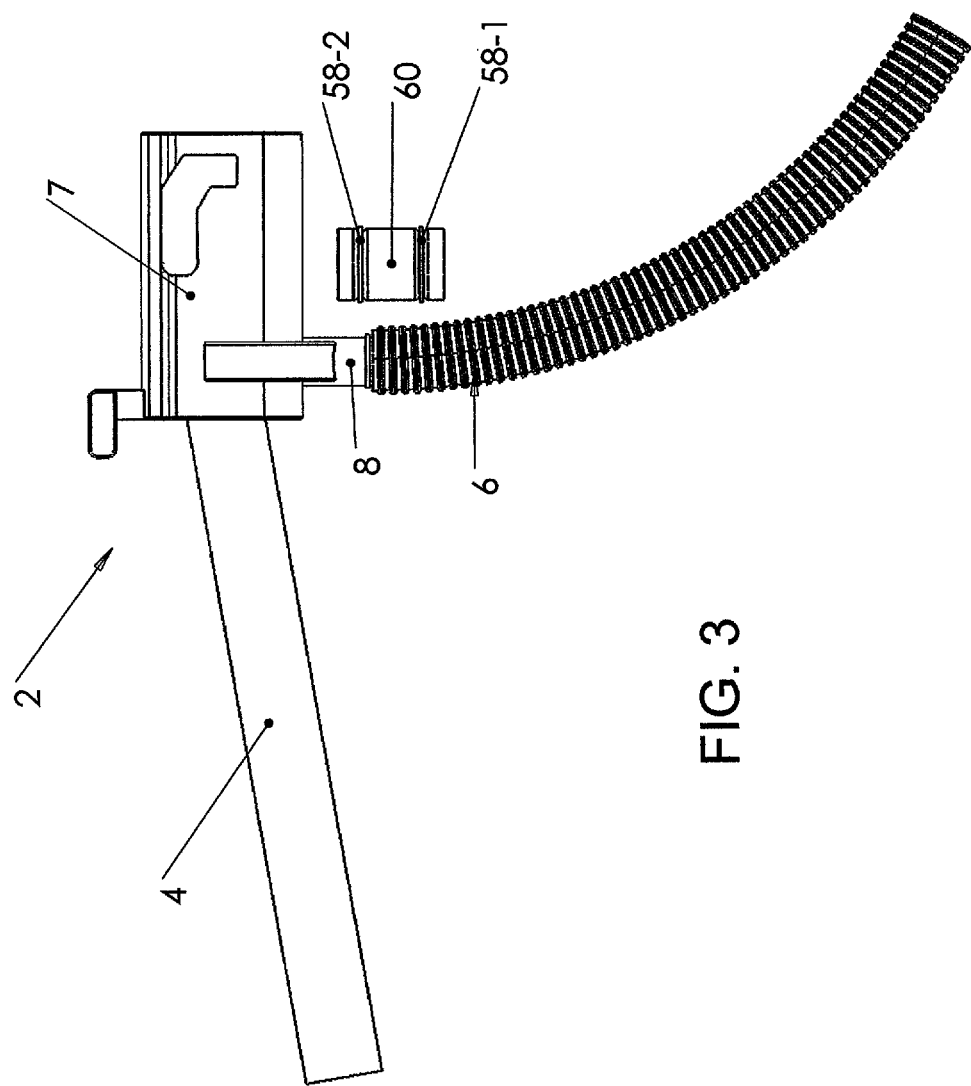
FIG. 3 is a perspective view of a part of the debris collection system of FIGS. 1 and 2, particularly illustrating the ribbed connecting pipe coupling to the fan outlet of the blower/vacuum.
Figure 15:
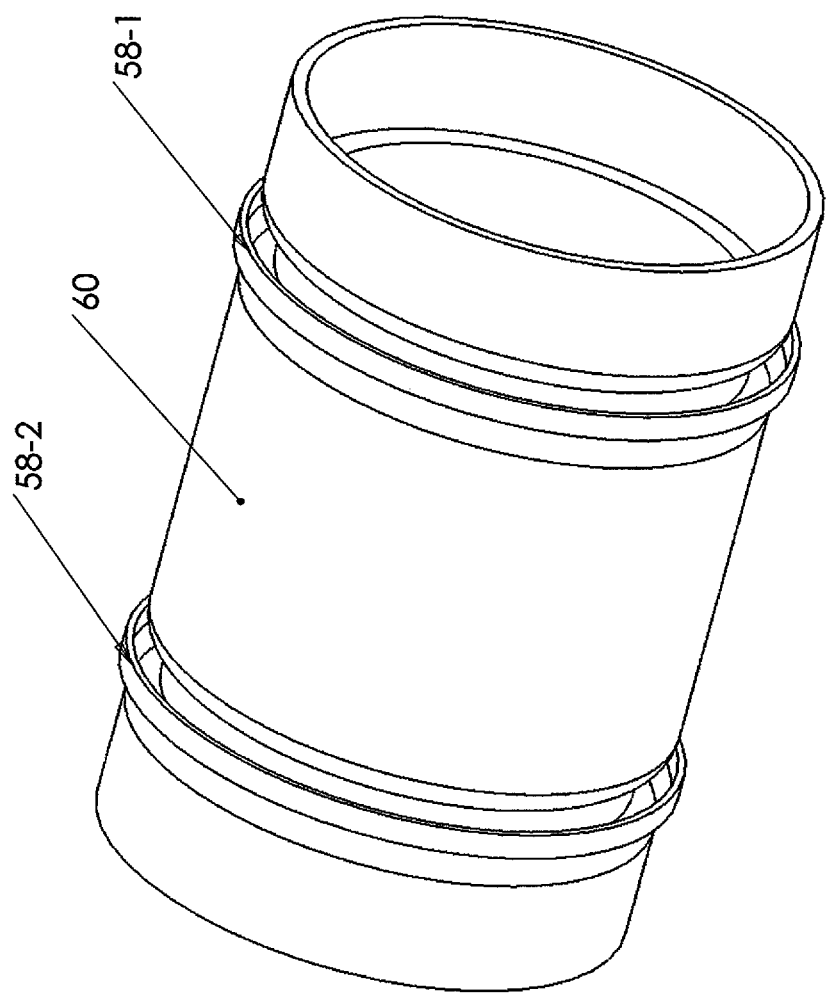
FIG. 15 is a perspective view of a part of the debris collection system of FIGS. 1, 2 and 3, particularly illustrating the Poly Tubing coupling sleeve connecting the fan outlet of the blower/vacuum to the ribbed connecting pipe.

FIG. 3 shows a view with more details of the first part of the debris collection system 2 of the present invention including the vacuum tube 4 and the fan outlet 8 of the blower/vacuum 7, the Poly Tubing coupling sleeve 60 between the fan outlet 8 and the ribbed connecting pipe 6, the cable ties 58-1 and 58-2 for holding and sealing the Poly Tubing coupling sleeve 60. In FIG. 3, the Poly Tubing coupling sleeve is placed next to the ribbed connecting pipe 6 and the fan outlet 8 for more clarity, but it must be seen as covering the two pipes. The ribbed connecting pipe 6 consists of a ribbed pipe used for drainage and is sold commercially. The ribbed connecting pipe 6 is airtight and is highly resistant to abrasion caused by the debris coming from the blower/vacuum 7. The grooves on the ribbed connecting pipe 6 allow to attach it tightly to the fan outlet 8 of the blower/vacuum 7 with the Poly Tubing coupling sleeve 60 and to form an airtight seal. The Poly Tubing coupling sleeve 60 is made of a flexible plastic Poly Tubing or another material with a diameter slightly larger than the ribbed connecting pipe 6. The Poly Tubing coupling sleeve 60 cover a part of the fan outlet 8 of the blower/vacuum 7 and a part of the ribbed connecting pipe 8. Two circular cable ties 58-1 and 58-2 made of soft plastic sold commercially surround near each end of the Poly Tubing coupling sleeve 60 to seal the joint and hold together the fan outlet 8 of the blower/vacuum 7 and the ribbed connecting pipe 6. The diameter of the ribbed connecting pipe 6 is slightly larger than the diameter of the fan outlet 8 of the blower/vacuum 7 which allows inserting a part of the fan outlet 8 of the blower/vacuum 7 into the ribbed connecting pipe 6. In addition, an elevation near the end of the fan outlet 8 allow to hold tightly the Poly Tubing coupling sleeve 60 with the cable tie 58-2 tight on the fan outlet 8. FIG. 15 shows an enlargement of the Poly Tubing coupling sleeve 60. The cable ties 58-1 and 58-2 are sold commercially and are not subject to a claim.

Figure 4:
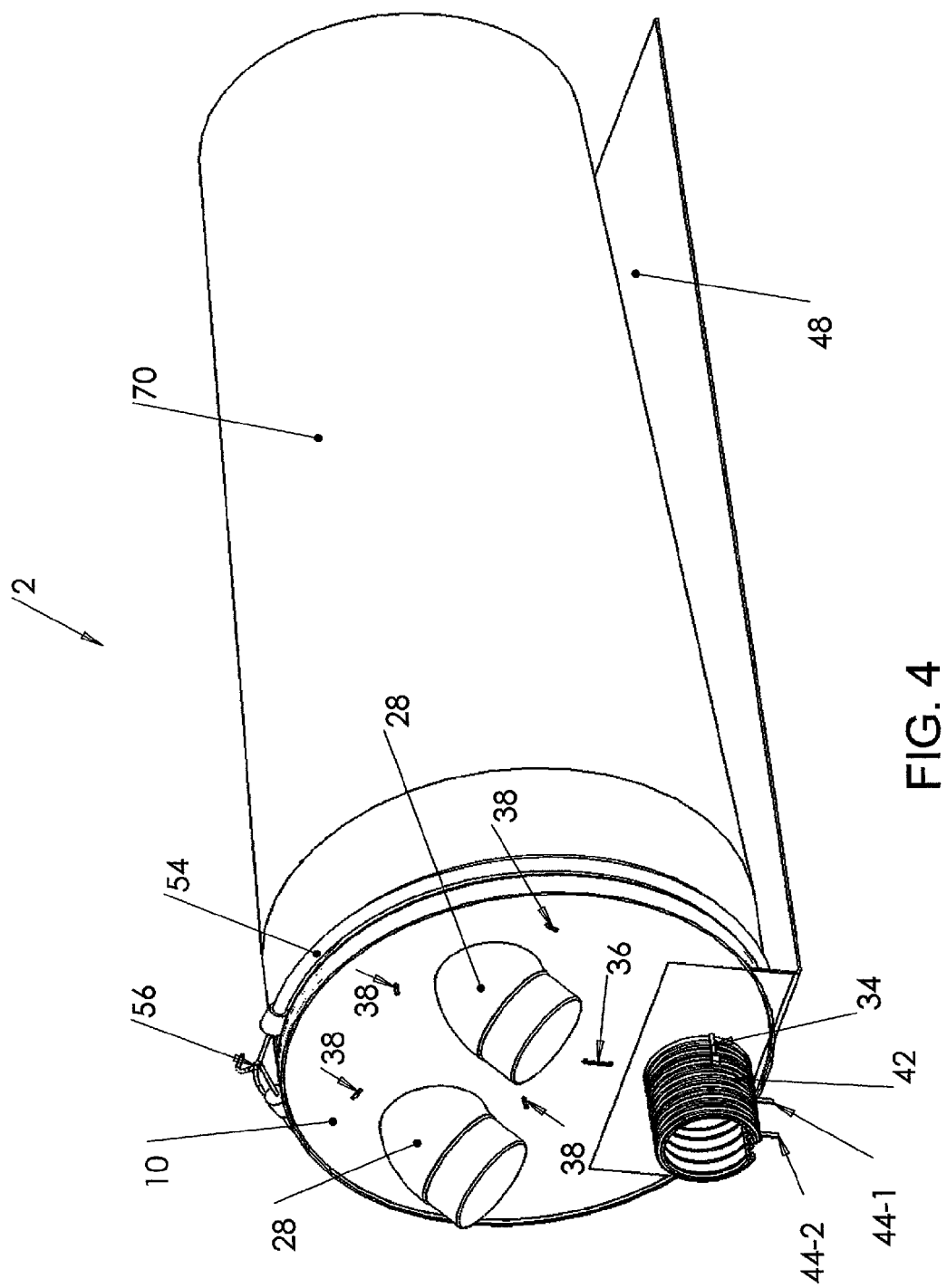
FIG. 4 is a perspective view of a part of the debris collection system of FIG. 1, particularly illustrating the ribbed connecting pipe coupling to the lid and the various elements such as the bungee cords, and the protective membrane under the bag.
Figure 18:
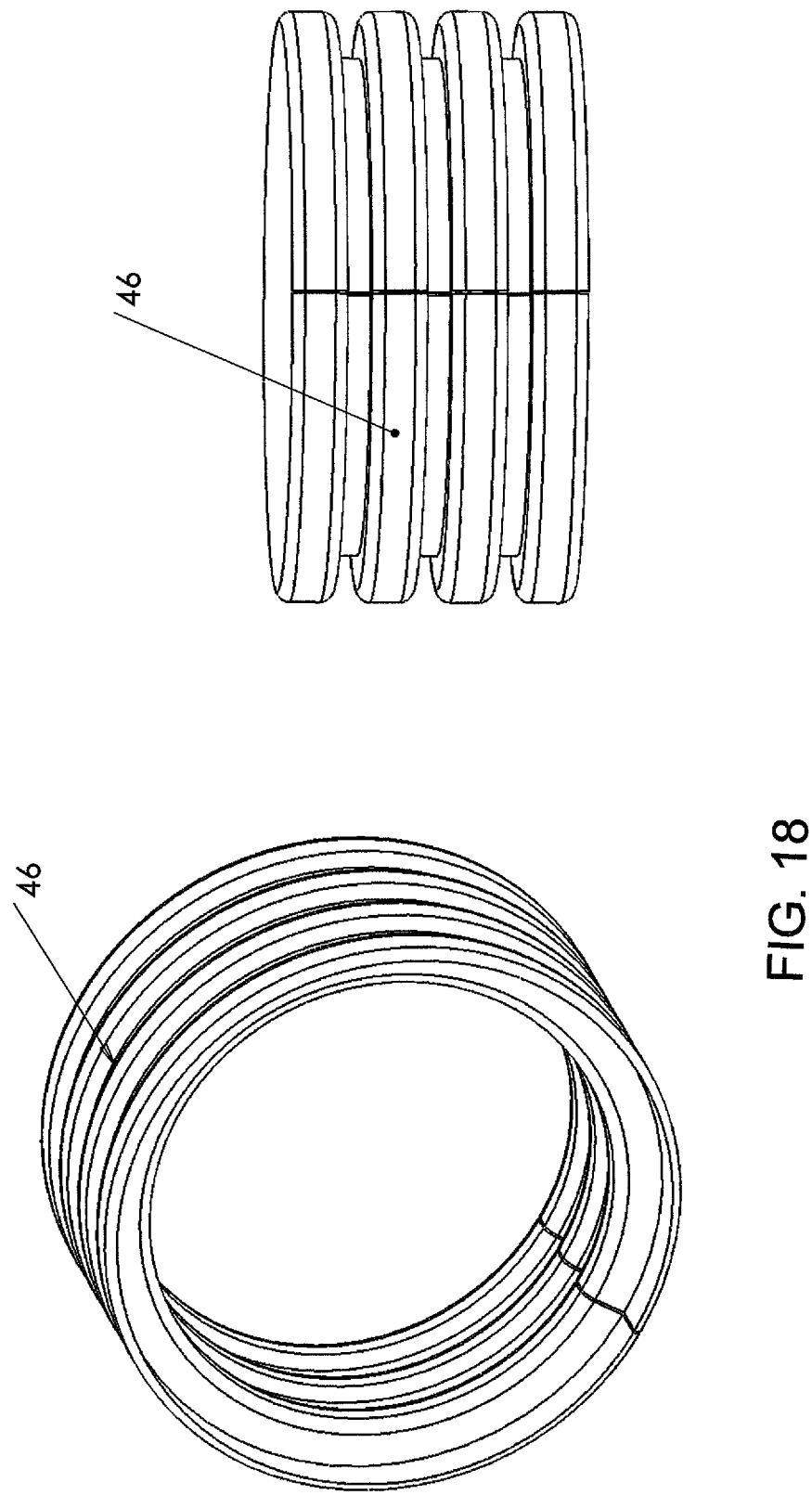
FIG. 18 is a perspective view of a part of the debris collection system of FIG. 2, particularly illustrating the design of two pieces of ribbed pipes inserted into the lid to direct the air outlet parallel to the ground.

FIG. 4 shows a view with more details of the second part of the debris collection system 2 of the present invention made up of: ribbed pipe coupling 42, cable ties 44-1 and 44-2 surrounding ribbed pipe coupling 42, cable ties 34 holding ribbed pipe coupling 42 in place on lid 10, protective membrane 48 with its front part that is inserted around ribbed pipe coupling 42 to hold in place the protective membrane 48, the two elbows 28 for the air outlet, cable ties 36 to attach onto the inside of the lid 10, one of the two 45 degree elbows (not visible in FIG. 4), cable ties 38 are used to attach the two strainers to lid 10 on the inside (not visible in FIG. 4), and bungee cord 54 and hooks 56 are used to hold the bag 70 around the lid 10. FIG. 18 shows bungee cord 54 with more details. The bungee cord 54 is sold commercially.

Figure 5:
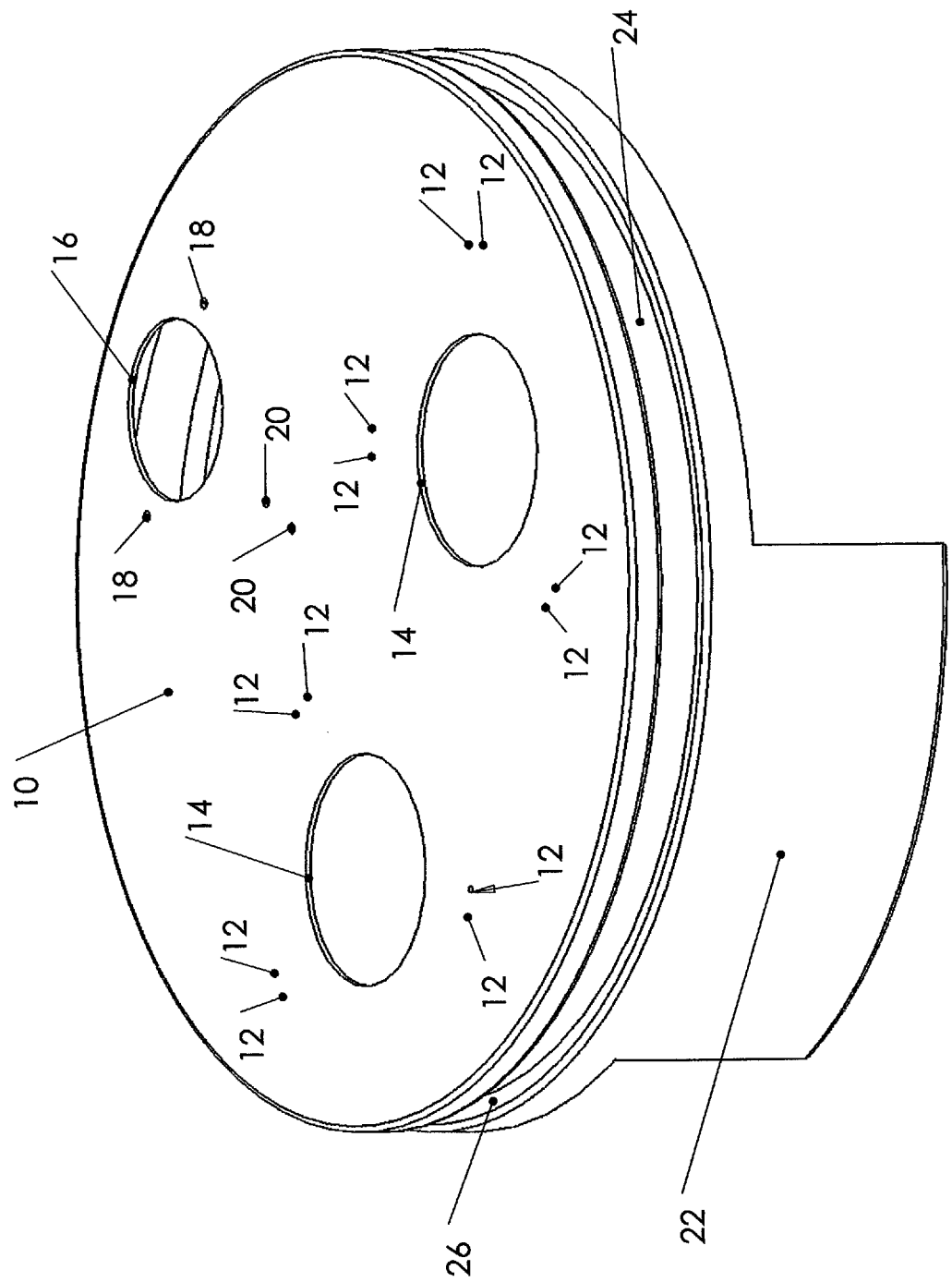
FIG. 5 is a perspective view of a part of the debris collection system of FIGS. 1 and 2, particularly illustrating the lid alone with the preferred shape as well as the openings and the holes to attach the various elements.

FIG. 5 shows lid 10 in its preferred round shape, which has two openings 14 for the air outlet, an opening 16 to allow debris to enter, twelve holes 12 to hold the cable ties 38 (FIG. 6), two holes 20 to hold the cable ties 36 (FIG. 6), two holes 18 to hold the cable ties 34 (FIG. 6), a 360 degree groove 24 with a flat bottom on the side of the lid 10 and whose sides 26 are parallel and inclined toward the top of the lid 10. The groove 24 and the sides 26 can also be arranged to form a V. The V-shaped arrangement allows the bag to stay in place without having to use an anti-skid tape at the bottom of the groove, but has less friction and holds the debris collection bag inside the groove. The V-groove is not shown in the figures for simplification purposes. Only the flat-bottomed groove 24 of which the sides 26 are parallel and inclined toward the top of the lid is shown in various figures. However, it must be considered in the description that groove 24 and sides 26 apply to both arrangements and also apply to the V-groove even if it is not shown in FIG. 5. The protective wall 22 is an extension of a part of the side wall of the lid, located on the opposite side of opening 16. This extension will protect the wall of the lid 70 and also the operator when the debris is entering with force from the blower/vacuum 7. The lid can be made of plastic or metal. Plastic, however, is the preferred material in the present invention.

Figure 6:
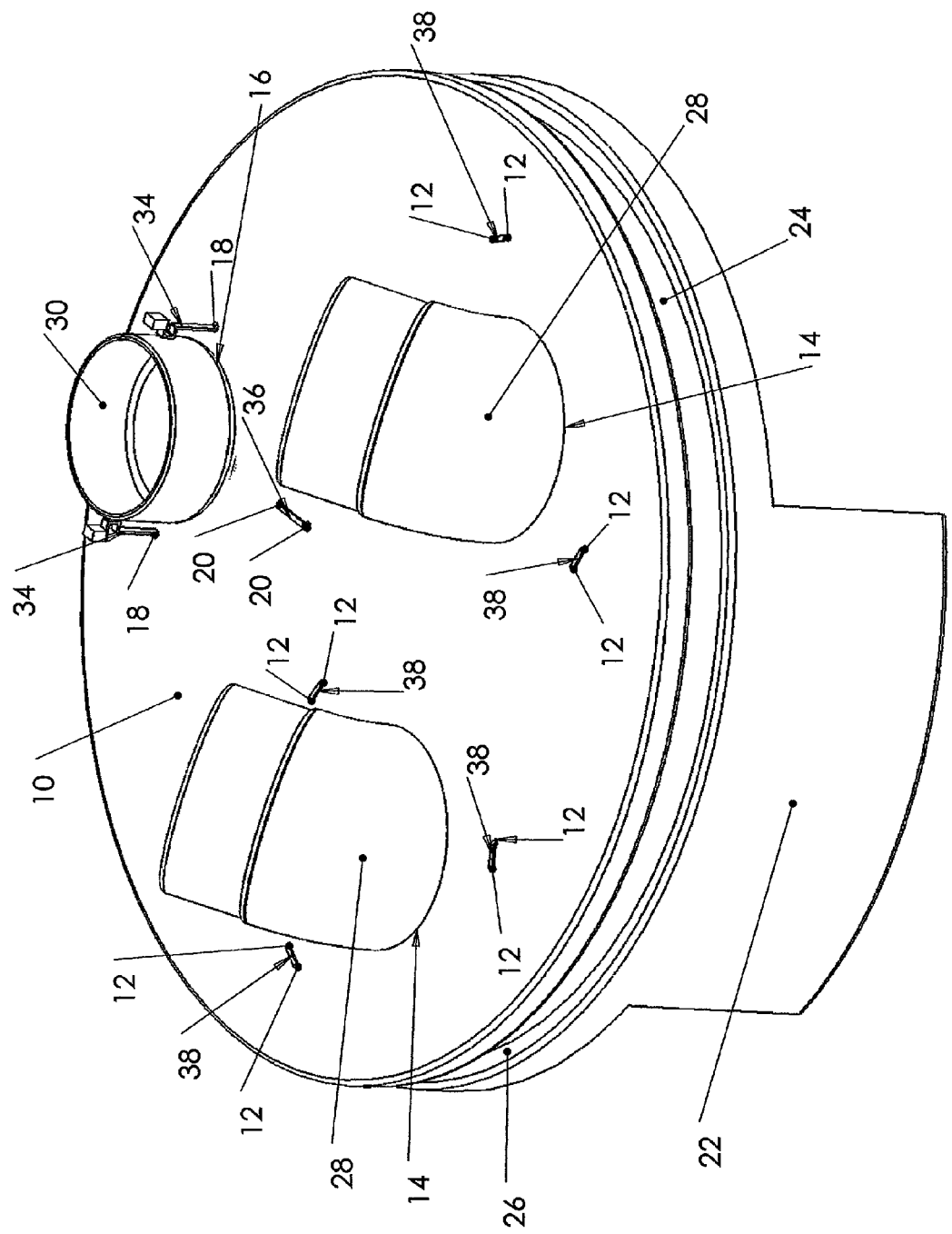
FIG. 6 is a top view of a part of the debris collection system of FIG. 1, particularly illustrating the lid with the elbows allowing air out and debris in, as well as the cable ties.

FIG. 6 shows a top view of the lid 10 with the two elbows 28 for the air outlet inserted into openings 14, the female part of the 45 degrees elbow 30 inserted into opening 16 to allow debris to enter, the top of two cable ties 34, the top of cable tie 36 and the top of the six cable ties 38. The cable ties 34, 36 and 38 are sold commercially under various trade names. The two cable ties 34 are used to hold the ribbed connecting pipe 6 (FIG. 1) at the place where it joins the ribbed pipe coupling 42 (FIG. 1), the cable tie 36 is used to attach the 45 degree elbow 32 (FIGS. 7, 8, 9, 10) to the inside face of the lid and the six cables 38 are used to attach the two strainers 40 (FIGS. 7, 8, 9) to the inner side of the lid. The outer diameter of the two elbows 28 is similar to the openings 14. The elbows 28 are held in place in the openings 14 by the friction between the walls of the openings 14 and the elbows 28. The bottom part of the elbow 28 has a shoulder of which the diameter is larger than the diameter of the openings 14, which prevents the elbows 28 from moving forward when they are inserted into the openings 14. FIG. 6 also shows the protective wall 22 and the 360 degree groove 24 with a flat bottom with the parallel sides 26 upwardly inclined.

Figure 7:
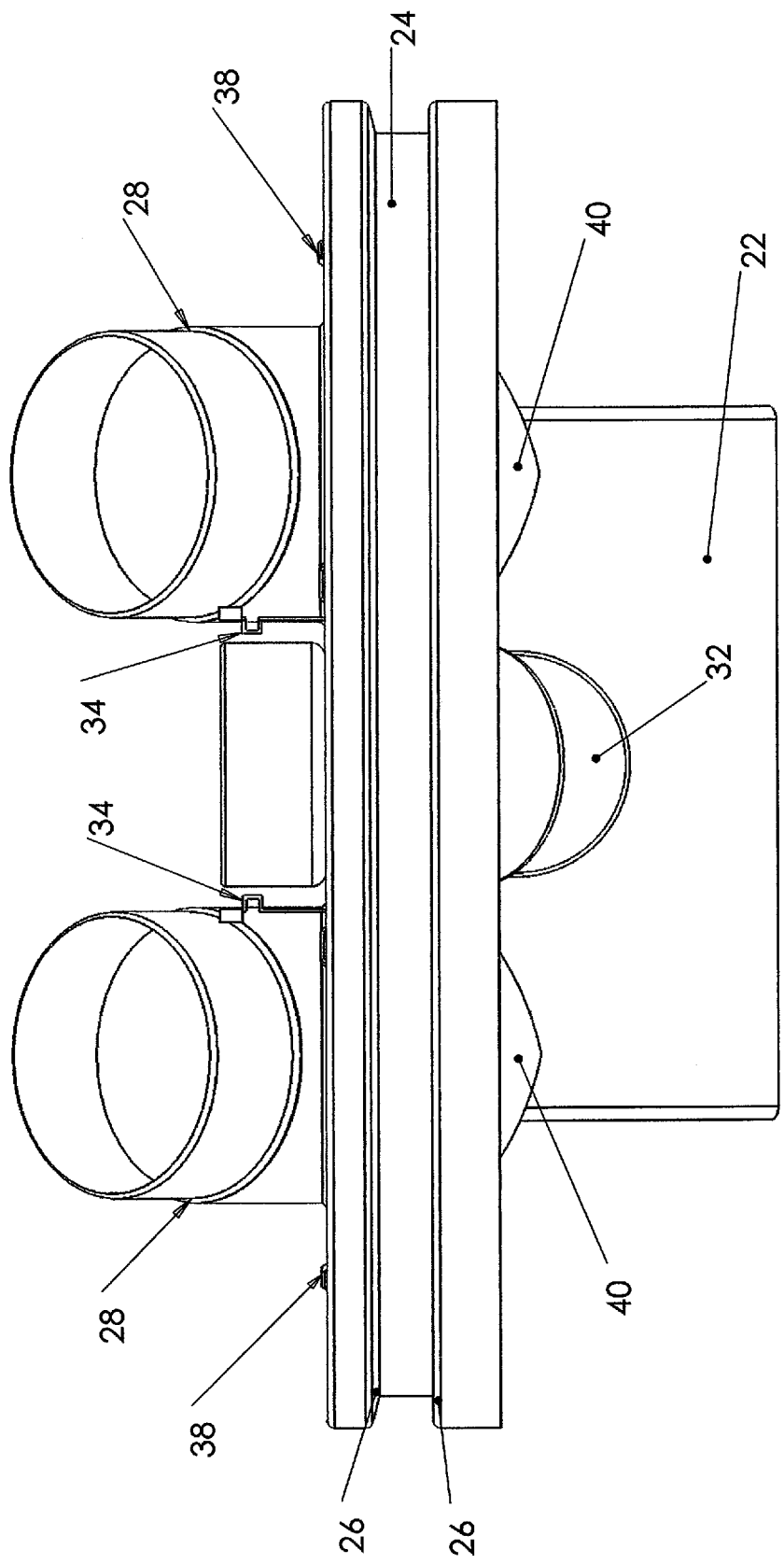
FIG. 7 is a front view of a part of the debris collection system of FIG. 1, particularly illustrating the lid with the elbows allowing air out and debris in, the various cable ties and the two strainers.

FIG. 7 shows a front view of the lid 10 with the two elbows 28 for the outlet of air, both elbows 30 and 32 of 45 degree and the top of the domed shape of the two strainers 40 placed on the inside face of the lid. The two strainers 40 are preferably made of stainless steel, but they may be made of another material. The groove 24 and the two sloping parallel sides 26 are also shown. In this view, the female part of the 45 degree elbow 30 and the male part of the 45 degree elbow 32 is visible. The elbows 30 and 32 each have a male and a female part. The male part is smaller than the female part and enables the insertion of one into the other to form a 90 degree angle. The female part of the elbow 32 is supported on the inside of the lid and enables the retention of the elbow 30 to the lid.

Figure 8:
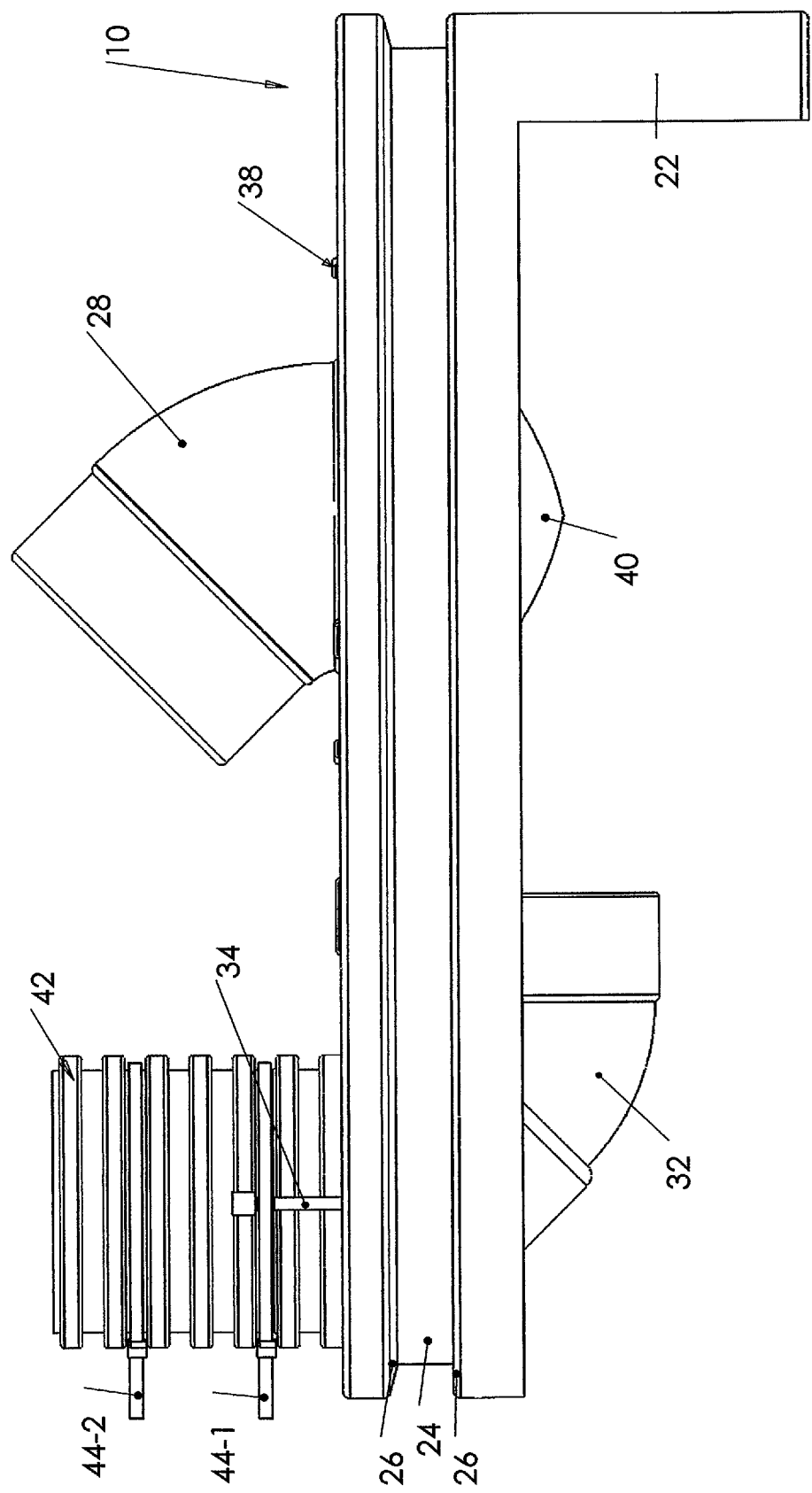
FIG. 8 is a side view of a part of the debris collection system of FIG. 1, particularly illustrating the lid with the elbows for the air outlet, the ribbed pipe coupling allowing debris in, the various cable ties and the two strainers.
Figure 19:
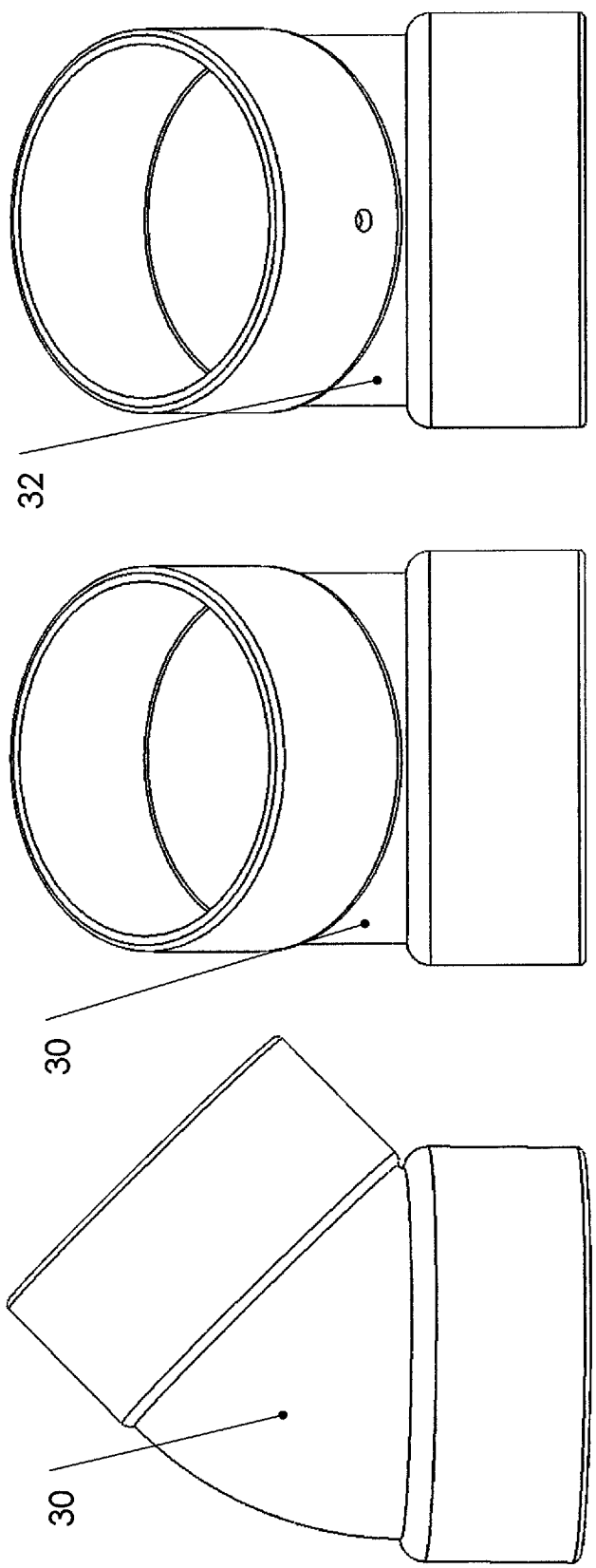
FIG. 19 is a perspective view of a part of the debris collection system of FIGS. 1 and 2 particularly illustrating the design of two 45 degree elbows to allow debris to enter into the debris collection bag.

FIG. 19 shows the design of the elbows 30 and 32. The 45 degree elbows 30 and 32 are sold commercially. Elbow 32 has been modified by drilling a hole in the wall of the male part near the inner side of the lid in order to allow the insertion of the cable tie 36 (FIG. 6) to hold the elbow 32 attached to the inside of the lid. FIG. 7 also shows the cable ties 34 in the form they take when they are attached to the ribbed pipe coupling 42 (FIG. 8). Originally, the cable ties are straight, but they take a curved shape to match the shape of the groove of the ribbed pipe coupling 42 (FIG. 8) when they are attached with the cable tie 44-1 (FIG. 8). FIG. 7 also shows the circular groove 24 which goes around the side of the lid. On the groove 24 will be pasted an anti-skid tape that will hold in place the debris collection bag when the bungee cord 54 (FIGS. 1, 2, 4, 18) is placed over the edge of the bag. The two sides 26 of the groove 24 are parallel and inclined toward the top of the lid to help maintain the edge of the bag 70 (FIGS. 1, 2, 4) and the bungee cord 54 (FIGS. 1, 2, 4) over the side of the lid. The anti-skid tape and the bungee cord 54 are sold commercially. The claim applies only to the layout of the bungee cord 54 and the anti-skid tape in groove 24.

Figure 14:
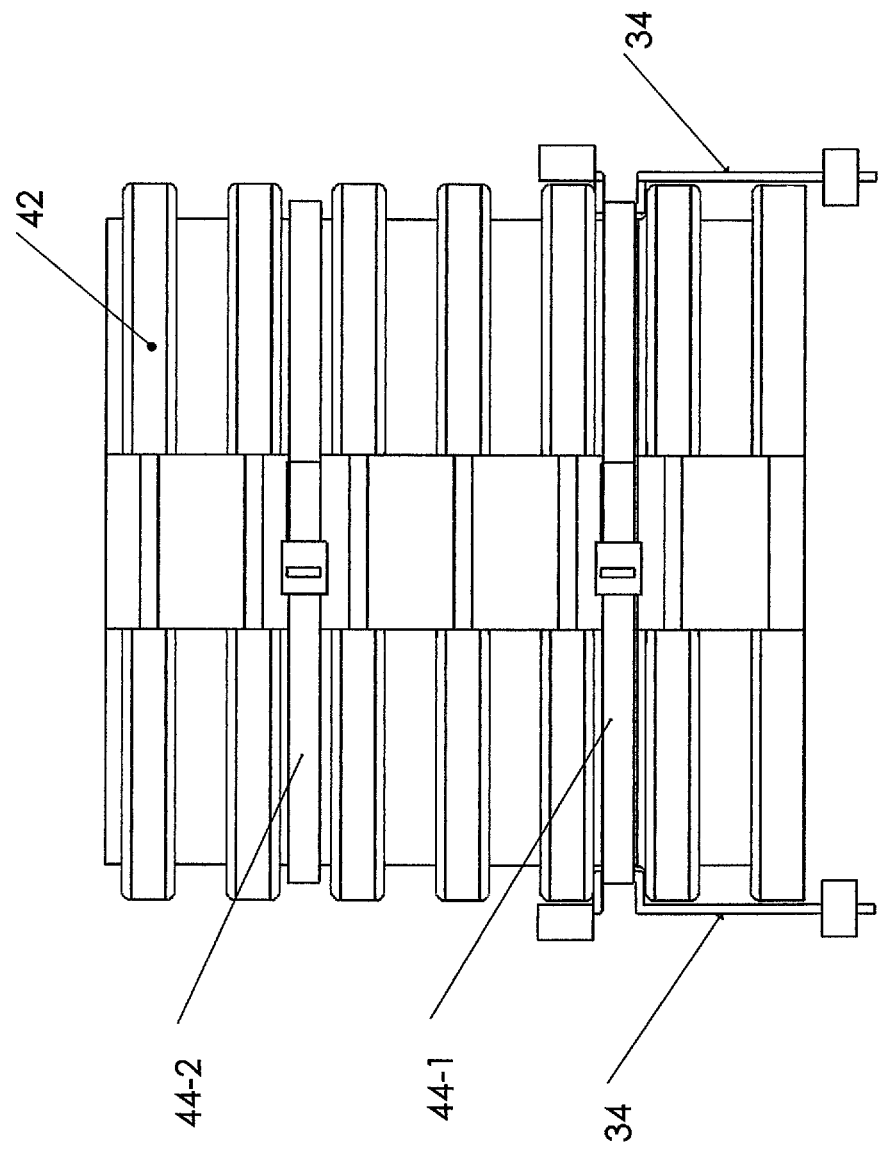
FIG. 14 is a perspective view of a part of the debris collection system of FIGS. 1 and 2, illustrating in detail the ribbed pipe coupling and the various cable ties.

FIG. 8 shows a side view of the lid with the same elements as in FIG. 7 plus the ribbed pipe coupling 42 to attach the lid 10 to the ribbed connecting pipe 6 (FIGS. 1, 2, 3). This view allows one to better judge the position of the various components, particularly the view of the elbow 32 in relation to the elbows 28 as well as the protective wall 22. In use, the outputs of the two elbows 28 will be directed towards the ground so that dust is not directed toward the operator. Debris and air from the blower/vacuum hit the protective wall with force 22 and then be directed into the bag 70 (FIGS. 1, 2, 4) while the air will get out through the strainers 40. The protective wall 22 (made of thick plastic) has the role of absorbing the impact of debris to prevent breakage of the fragile wall of the bag 70. The ribbed pipe coupling 42 is made of a ribbed pipe of the same size as the ribbed connecting pipe 6 for the connection to the fan outlet of the blower/vacuum 7. For the ribbed pipe coupling 42, the piece of pipe was cut along the length perpendicular to the grooves to allow the insertion of the female part of the elbow 30 and the end of the ribbed connecting pipe 6 into the ribbed pipe coupling 6. A single cut is made on the ribbed pipe coupling 42 so that it remains in one piece. The ribbed pipe coupling is held by the plastic cable ties 34 and the plastic cable tie 44-1 which is placed around the ribbed pipe coupling 42 in a groove of the ribbed pipe coupling 42. The cable tie 34 has a bulge on the upper end which prevents slippage of the cable tie 34 when the cable tie 44-1 is in place. The cable tie 34 also has another bulge on the lower end on the side of the inside of the lid 10. The bulge on the lower end of the cable tie 34 is formed by inserting the self-locking part of a second similar cable tie of which the long part has been cut. The set of two cable ties gives the cable tie 34. FIG. 14 shows the detail of the ribbed pipe coupling 42 and of the cable ties 34 and 44-1 and 44-2.

Figure 9:
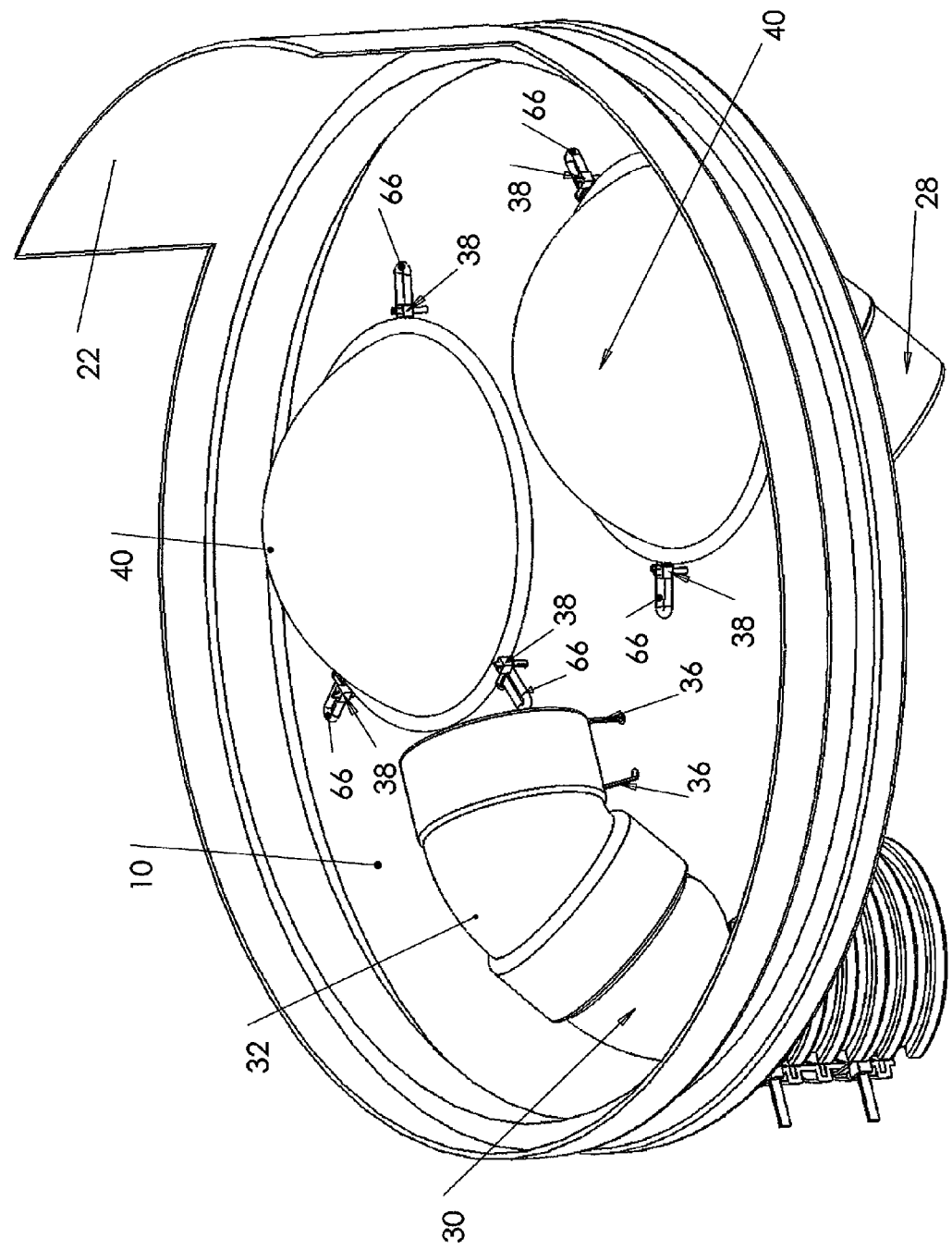
FIG. 9 is a perspective view of a part of the debris collection system of FIG. 1, particularly illustrating the inside of the lid with the elbow that lets in debris, as well as the strainers and the cable ties.

FIG. 9 shows a view of the inside face of the lid 10 with the elbows 30 and 32 leading the debris in between the two strainers 40. It is possible to see the arrangement of cable tie 36 used to attach elbow 32 to the lid 10 as well as the position and the domed shape of the two strainers 40 that allow the air to get out while retaining the debris inside the bag 70 (FIGS. 1, 2, 4) for the collection of debris. The two strainers 40 are preferably made of stainless steel, but they may be made of another material. FIG. 9 also shows cable ties 38 that hold the strainers 40 by the ears 66 attached to lid 10. The two strainers 40 each have three ears 66 positioned on the rigid circular edge of the strainer 40 in contact with the inside of the lid. Each strainer 40 completely covers an opening 14 (FIGS. 5, 6) made in the lid to let out the air. FIG. 9 also shows the wall 22 of the lid 10 which serves to protect the bag 70 from the impact of debris that enters by the elbows 30 and 32.

Figure 10:
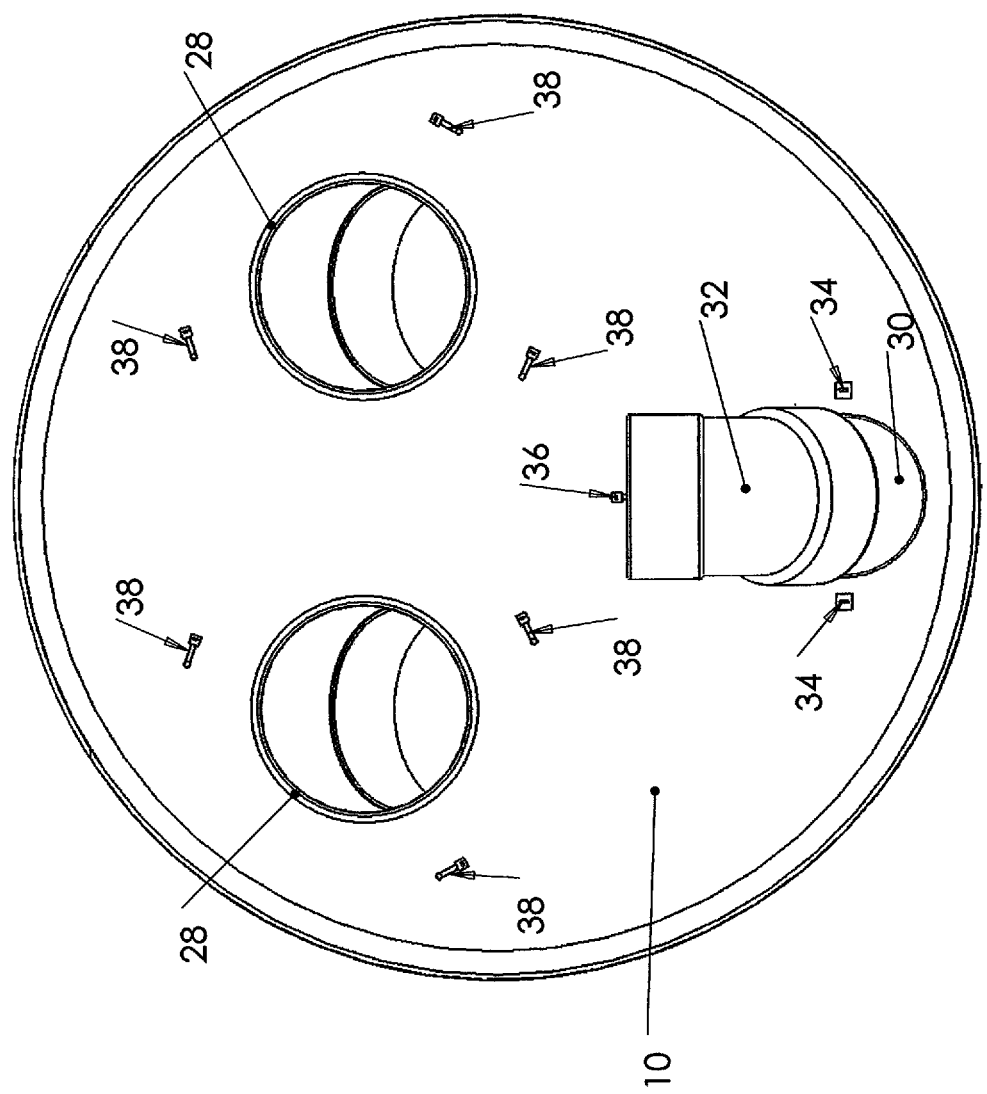
FIG. 10 is a front view of a part of the debris collection system of FIG. 1, particularly illustrating the inside of the lid with the elbows that lets in debris without the strainers.

FIG. 10 shows the inside face of the lid with the elbows 30 and 32, cable ties 38 to attach the two strainers 40 (FIG. 9), the bulge of the lower part of the two elbows 28 and the bulge on the end of the lower part of the cable 34. The bulge of the lower part of the two elbows 28 is in contact with the inner side of the lid 10. The elbows 28 are centered relative to each of the two strainers 40 located above so that the air evacuated from the bag 70 passes through the two strainers 40 before leaving through the elbows 28. The two cable ties 34, the end of the cable tie on the inside of the lid 10 is larger than the diameter of holes 18 (FIGS. 5, 6). The cable ties 34 are held onto the lid 10 when they are attached to the ribbed pipe coupling 42 on the opposite side of the lid 10 with the cable tie 44-1. In this position cable tie 34 retains the ribbed pipe coupling 42 to the lid 10.

Figure 11:
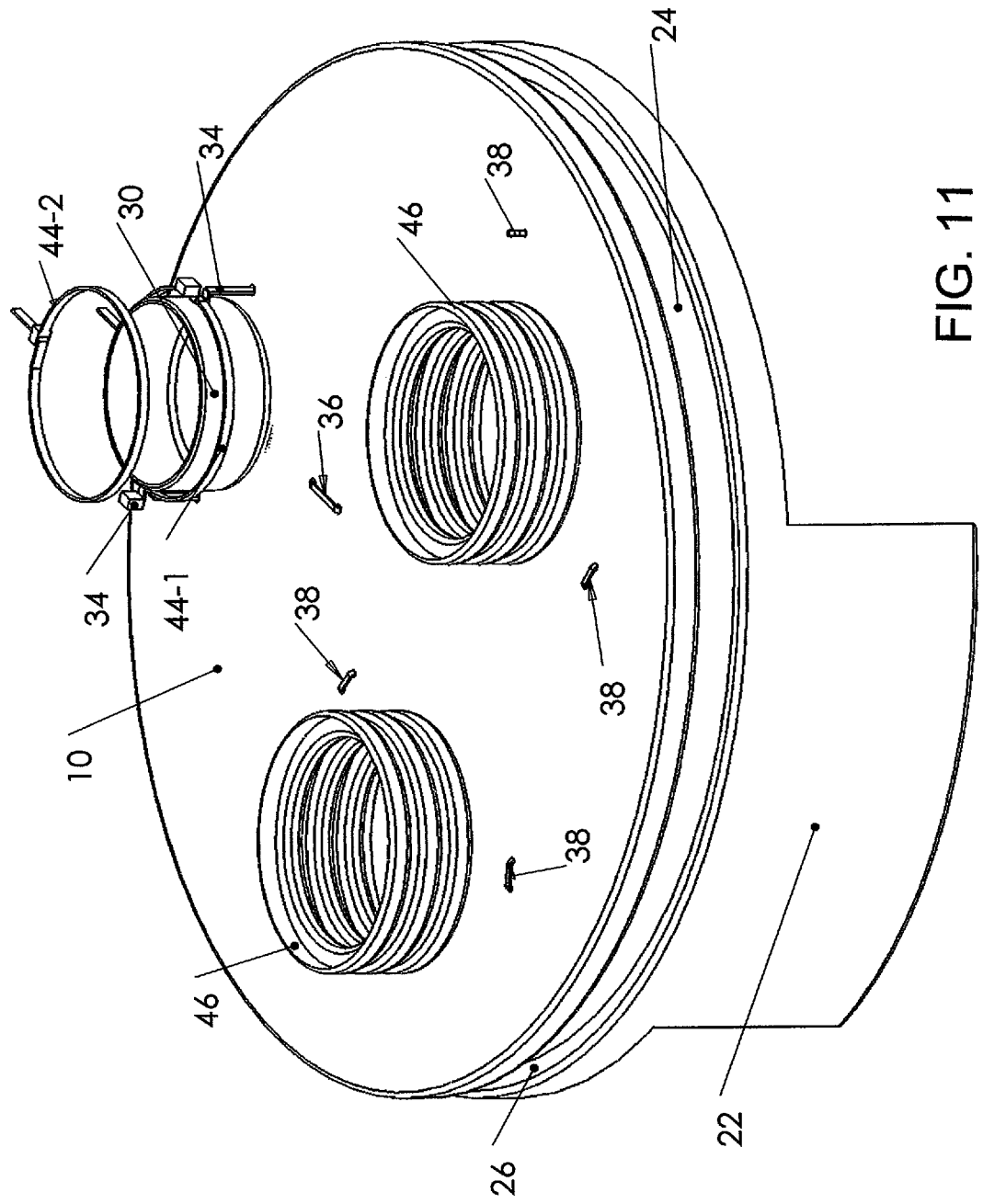
FIG. 11 is a perspective view of a part of the debris collection system of FIG. 2, particularly illustrating another embodiment for the air outlet with two straight ribbed pipes.

FIG. 11 shows the lid 10 according to the second preferred embodiment with two ribbed pipes 46 inserted into the openings 14 (FIGS. 5, 6) for the air outlet and the various cable ties 34, 36 and 38 which have been described previously. The two pipes 46 are pieces of ribbed pipe usually used for drainage. The diameter of the openings 14 in lid 10 is between the outer diameter of the ribbed pipes 46 measured at the bottom and at the top of the grooves. The ribbed pipes 46 are cut along the length perpendicular to the grooves so as to fold both sides inwards and insert them into the grooves in openings 14. FIG. 18 shows in more detail the design of pipes 46. Both sides of pipes 46 are then unfolded so that they conform to the shape of openings 14. Pipes 46 direct air parallel to the ground as the blower/vacuum works. This disposition prevents the air leaving the lid from being directed toward the face of the operator. Cable ties 44-1 and 44-2, the upper part of elbow 30, groove 24 and side 26 of groove 24 and the protective wall 22 are also presented to show the similarity between the two preferred embodiments. Components mounted on the inside of the lid 10 are the same as in the first preferred embodiment (FIG. 1) and are shown in FIGS. 9 and 10 where they are explicitly described in the text associated with these figures.

Figure 12:
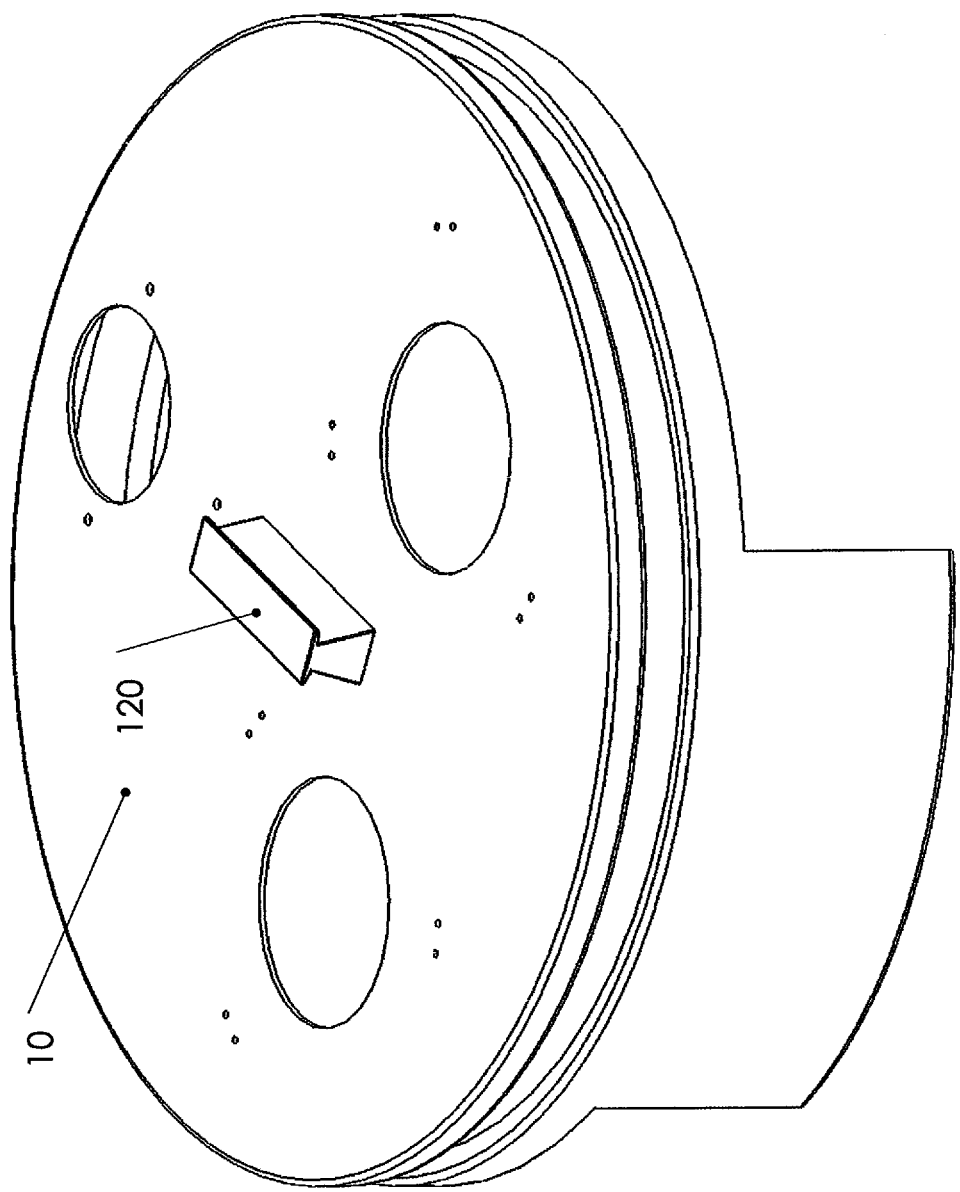
FIG. 12 is a perspective view of a third preferred embodiment of a part of the debris collection system 2, particularly illustrating the lid of the present invention with a handle.

FIG. 12 shows the lid 10 with a third preferred embodiment of a part of the debris collection system 2 of the present invention whose only difference from the previous embodiments is the addition of a T-shaped handle 120. The center of the handle lines up with the center of lid 10. The longest part of the handle is perpendicular to a right line drawn between the centers of the two openings 14. The handle 120 may be molded during manufacture of the lid 10 or manufactured alone and then screwed underneath the inside of the lid 10. The handle 120 will give an additional handle to carry the lid 10.

Figure 13:
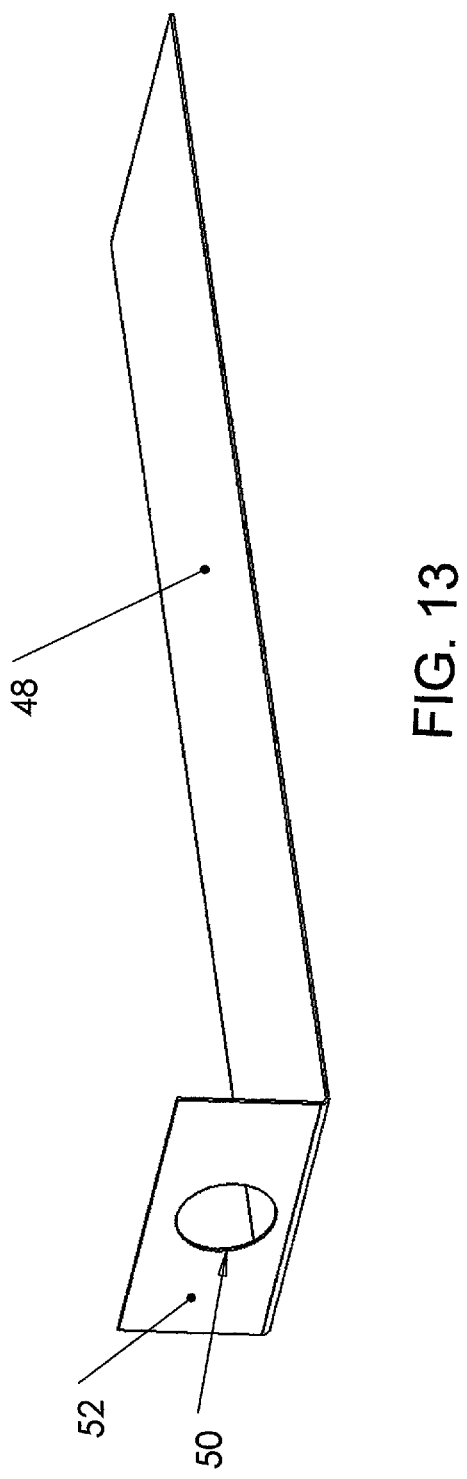
FIG. 13 is a perspective view of a part of the debris collection system of FIGS. 1 and 2, particularly illustrating the membrane protecting the debris collection bag.

FIG. 13 shows the membrane 48 which is placed under the debris collection bag 70 (FIGS. 1, 2, 4) to collect the debris. The membrane 48 is made of a plastic material or other types of smooth material. This membrane is the same length or slightly longer than the bag 70 in order to protect the bag 70 from the roughness of the ground and facilitate the movement of the debris collection system 2 by the operator. The membrane is flexible and is folded where the lid 10 (FIGS. 1, 2, 4) perpendicular to the ground to form the front 52. The front 52 has a round opening 50 centered relative to the edge of the membrane in the front. The diameter of the opening 50 is larger than the diameter of the ribbed pipe coupling 42 (FIGS. 1, 2, 4, 8) which allows one to insert the ribbed pipe coupling 42 into the opening 50. The ribbed pipe coupling 42 and the elbow 30 (FIGS. 6, 7, 11) hold the membrane 48 in place when the operator is moving.

FIG. 14 shows in detail the ribbed pipe coupling 42 connecting the elbow 30 to the ribbed connecting pipe 6. The ribbed pipe coupling 42 has been described in FIG. 8. The ribbed pipe coupling 42 consists of a piece of ribbed pipe used for drainage. This ribbed pipe is sold commercially. The claim applies only to the change in the ribbed pipe to form the ribbed pipe coupling 42 between the elbow 30 (FIGS. 6, 7) and the ribbed connecting pipe 6 (FIGS. 1, 2, 3) and the attachment to the lid 10 (FIGS. 4, 7, 8, 9, 10, 11) with cable ties 34 and 44-1 and 44-2. The cable ties 34 shown in FIG. 14 are normally straight, but they become bent under the pressure of the cable tie 44-1. The bulge on the lower cable ties 34 is in contact with the inside of the lid 10 (FIG. 10).

FIG. 15 shows an enlarged view of the Poly Tubing coupling sleeve 60 of flexible plastic that links the ribbed connecting pipe 6 to the fan outlet 8 to let debris out of blower/vacuum 7 (FIGS. 1, 2 and 3) and cable ties 58-1 and 58-2. The cable ties 58-1 and 58-2 are sold commercially and are not subject to a claim.

Figure 16:
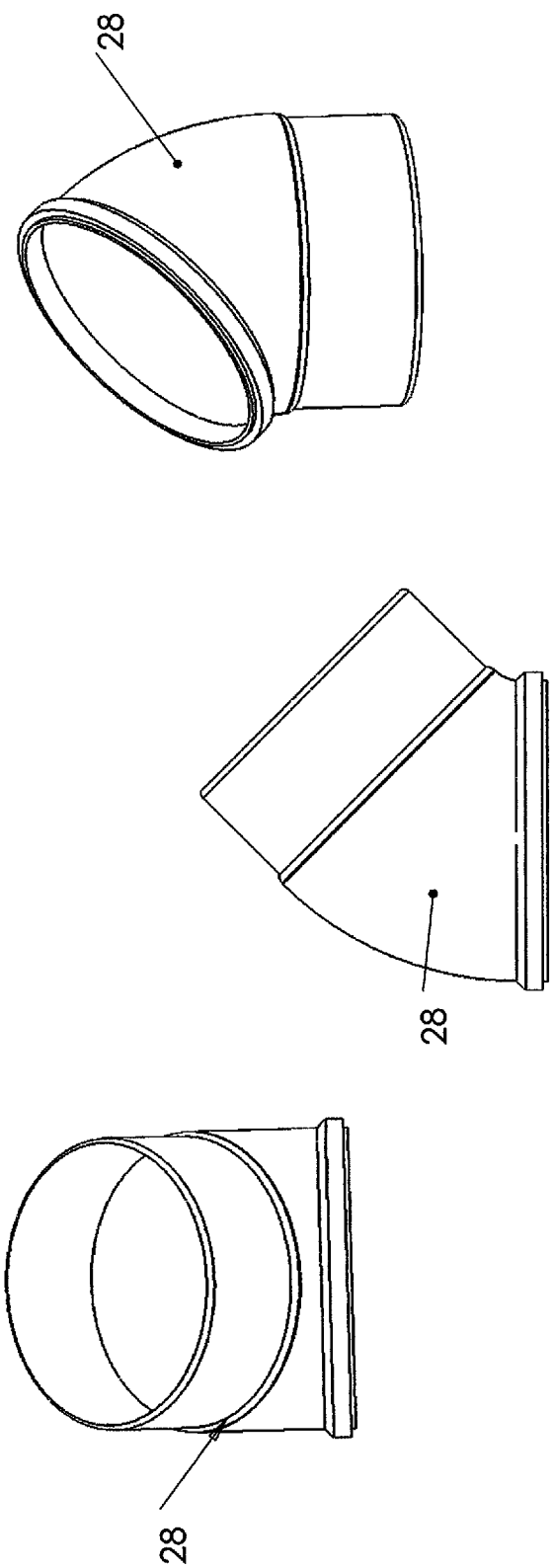
FIG. 16 is a perspective view of a part of the debris collection system of FIG. 1, particularly illustrating the design of elbows inserted into the lid to direct the air outlet toward the ground.

FIG. 16 shows in detail the design of the elbows 28 shown in FIGS. 1, 4, 6, 7, 8 10. Elbows 28 have a bulge in the lower part as shown in FIG. 16. This bulge has a larger diameter than the openings 14 of lid 10 which allows one to hold elbows 28 in the openings 14 of the lid 10. The outer diameter of the section above the bulge of the elbows 28 is similar to the diameter of the openings 14 which allow the insertion of the elbows 28 up to the bulge in the openings 14.

FIG. 17 shows in detail the design of elbows 130 that can be used to replace elbows 28 shown in FIGS. 1, 4, 6, 7, 8, 10. Unlike elbows 28, the shoulder will be on the outside face of the lid. The elbows are inserted into openings 14 through the top of the lid and will be held in place by placing a screw or a cable tie into holes 124 and 126 drilled in elbow 130. Screws or cable ties will be on the inside face of the lid 10.

FIG. 18 shows in detail the design of the ribbed pipe 46 used in the second preferred embodiment of the debris collection system 2 (FIGS. 2, 11). This pipe is placed in openings 14 of lid 10 (FIG. 11) instead of elbows 28 or 130 as described above. This pipe is made of a piece of ribbed pipe sold commercially for drainage. The ribbed pipe 46 is cut along its length perpendicular to the grooves.

FIG. 19 shows in detail the design of elbows 30 and 32 which have a 45 degree angle. Elbow 32 has a hole in the male part of the elbow. Elbow 30 is sold commercially as shown. Elbow 32 has a shape and size similar to elbow 30, but elbow 32 has been modified by adding a hole in the male part. The hole is on the 45 degree axis formed by the angle of elbow 32 and at an intermediate distance between the two ends of the male part of elbow 32.

Figure 20:
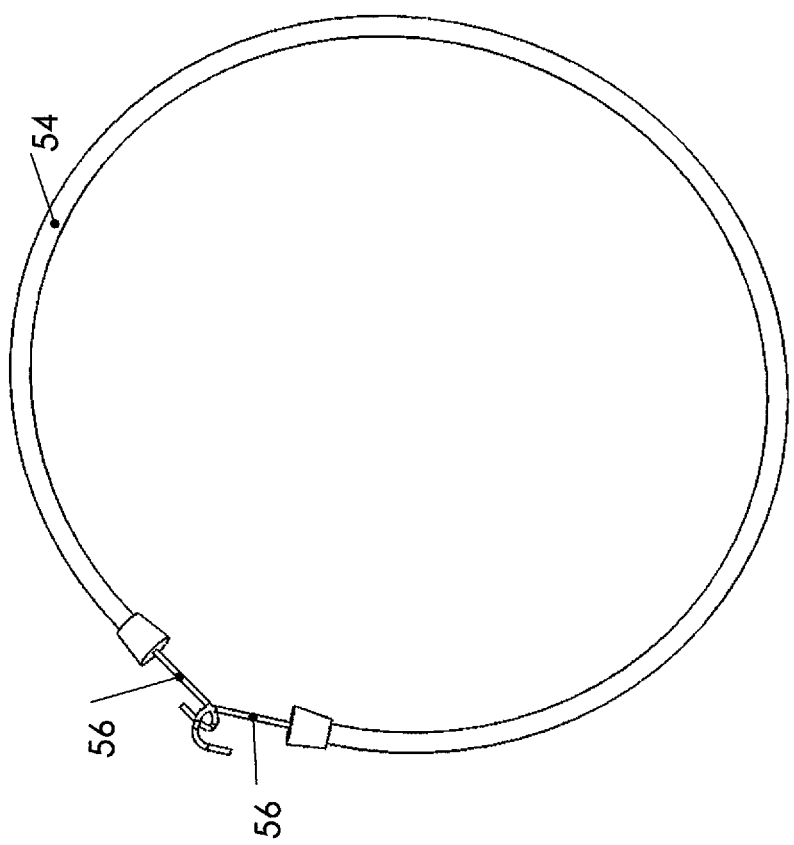
FIG. 20 is a perspective view of a part of the debris collection system of FIGS. 1 and 2, particularly illustrating the bungee cord and hooks to hold the debris collection bag around the lid.

FIG. 20 shows in detail bungee cord 54 and the two hooks 56 used to link together the two ends of the bungee cord. The bungee cord 54 is used to maintain pressure on the wall of the debris collection bag 70 (FIGS. 1, 2, 4) in the groove 24 (FIGS. 5, 6, 7, 8) of the lid 10. An anti-skid tape is glued to the bottom of the groove 24 to increase the friction with the wall of the debris collection bag 70. The pressure of the bungee cord 54 prevents the bag 70 from sliding out of the groove 24 during use and keeps bag 70 open and ensures that the debris goes into the bag 70.

Figure 21:
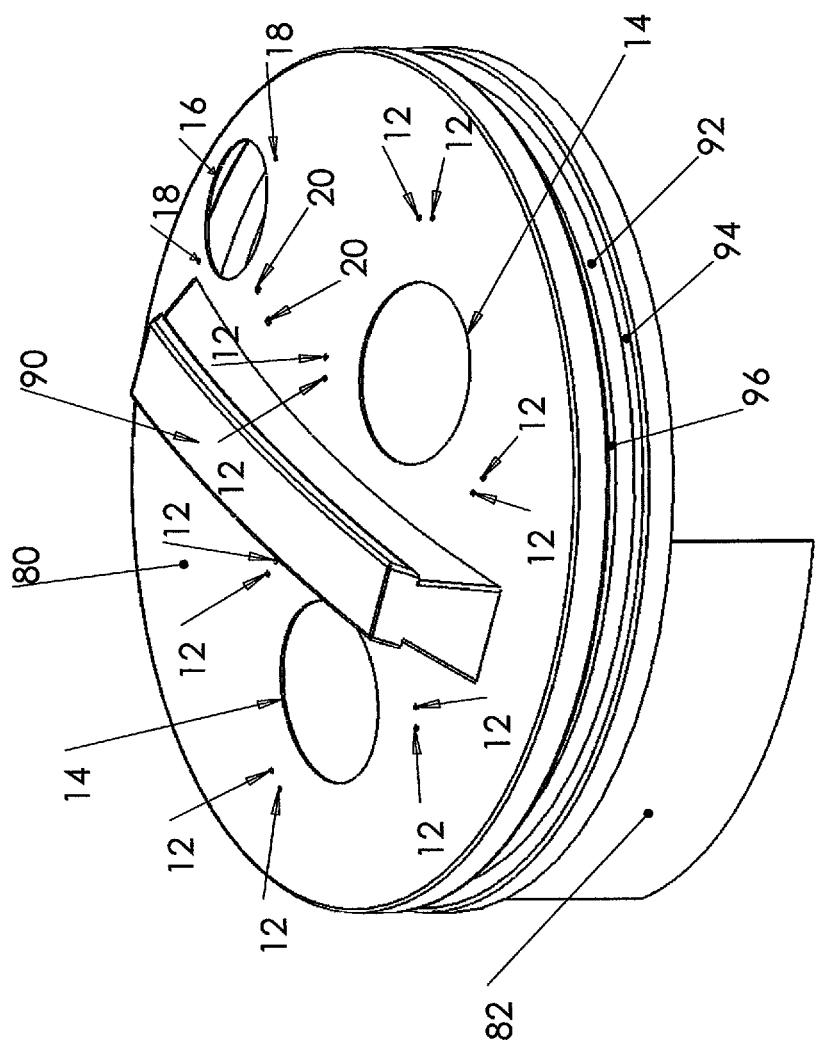
FIG. 21 is a perspective view of a part of the fourth preferred embodiment of the debris collection system 2, particularly illustrating a lid created from a first type of lid sold commercially.

FIG. 21 shows a fourth preferred embodiment of a part of the debris collection system 2 of the present invention for a type of lid sold commercially. This type of lid is described in Ferbrache U.S. Pat. No. 4,691,840, Sep. 1987. Lid 80 (round in shape) was created by making changes to the original shape described in U.S. Pat. No. 4,691,840 according to the arrangements claimed in the present invention. Lid 80 was created by making two openings 14 for air outlet, an opening 16 to let in debris, twelve holes 12 to hold the cable ties 38 (FIG. 6), two holes 20 to hold the cable ties 36 (FIG. 6), two holes 18 to hold the cable ties 34 (FIG. 6) and by adding a piece of flexible plastic 82 as a protective wall. The two openings 14 for the air outlet are located on either side and equidistant from the handle 90 of the lid 80. Both openings 14 are equidistant from a straight line (X) passing through the center of the lid and perpendicular to the handle of the lid 80. The opening 16 for the entrance of debris near the edge of the lid 80 is opposite to the openings 14 and is on the right side of the handle 90. Holes 12 are arranged in a circle from the center of each of the openings 14. The holes 12 are in pairs side by side and are divided into three groups around each of the openings 14. The two holes 20 are in a straight line drawn between the center of the opening where the debris comes in and the point of intersection with a perpendicular line drawn between the centers of the two openings 14 to let air out. The two holes 18 are opposite each other on either side of the opening 16. To form the protective wall 82, a flexible piece of plastic was glued to the inner side of the lid 80 so as to extend the wall located opposite to the opening 16. The protective wall 82 is centered from a straight line passing through the center of the opening 16 and a point on the intersection of the handle 90 with a perpendicular line through the center of the two openings 14. This extension will protect the wall of the bag 70 as well as the operator when the debris enters with force from blower/vacuum 7. The 360 degree groove 92 on the lateral contour of the lid 80 with a flat bottom and a side wall 94 perpendicular to the bottom of the groove 92 and a side 96 inclined outward at a 45 degree angle to the bottom of groove 92 is a type of lid sold commercially. Obviously, there are several types of grooves whose shape and size vary. The claimed invention is considered to apply to lids with lateral grooves of various shapes or sizes. All other components of the debris collection system are similar to those described in the two preferred arrangements mentioned above. The same components are not described in detail.

Figure 22:
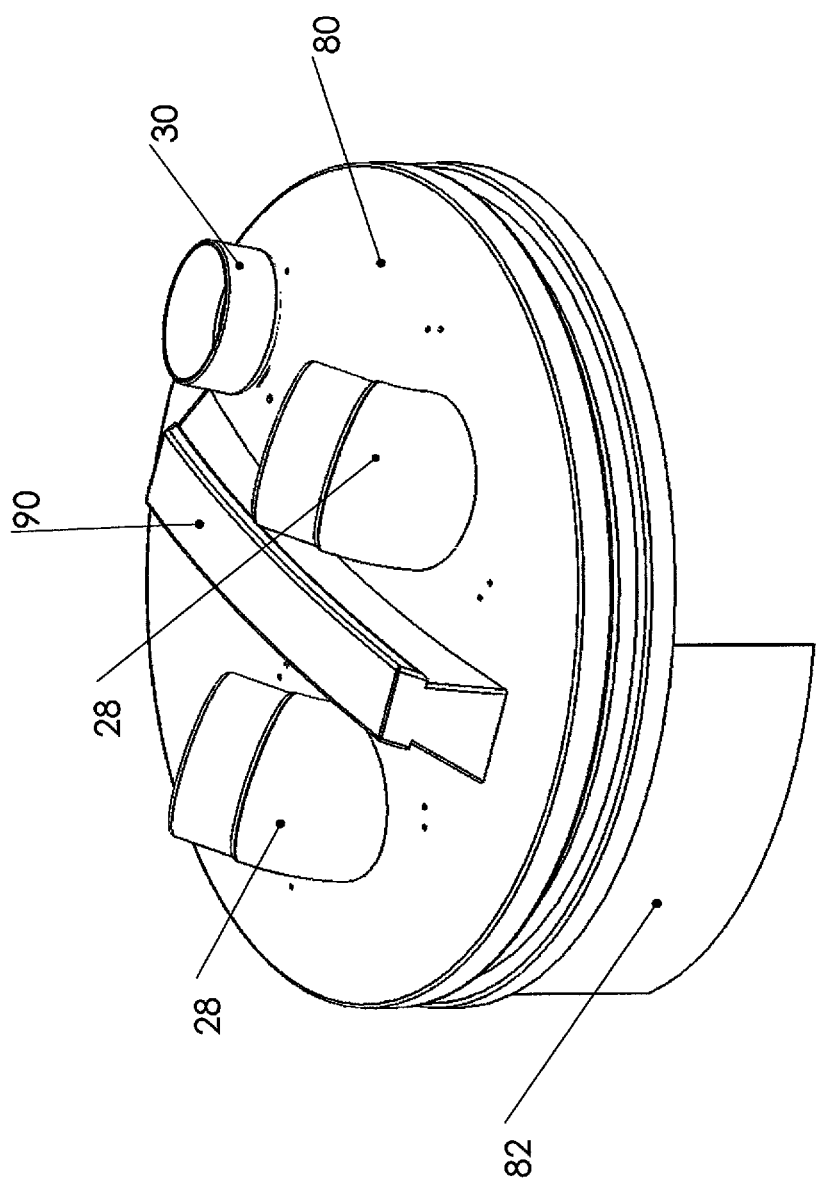
FIG. 22 shows a perspective view of the top and the side of the fourth preferred embodiment of the debris collection system 2 of the present invention created from a type of lid sold commercially.

FIG. 22 shows a perspective view of the top and side of the fourth preferred embodiment with the lid 80, the two elbows 28 to deflect the air towards the ground, the elbow 30 to let debris in, the protective wall 82 and the handle 90.

Figure 23:
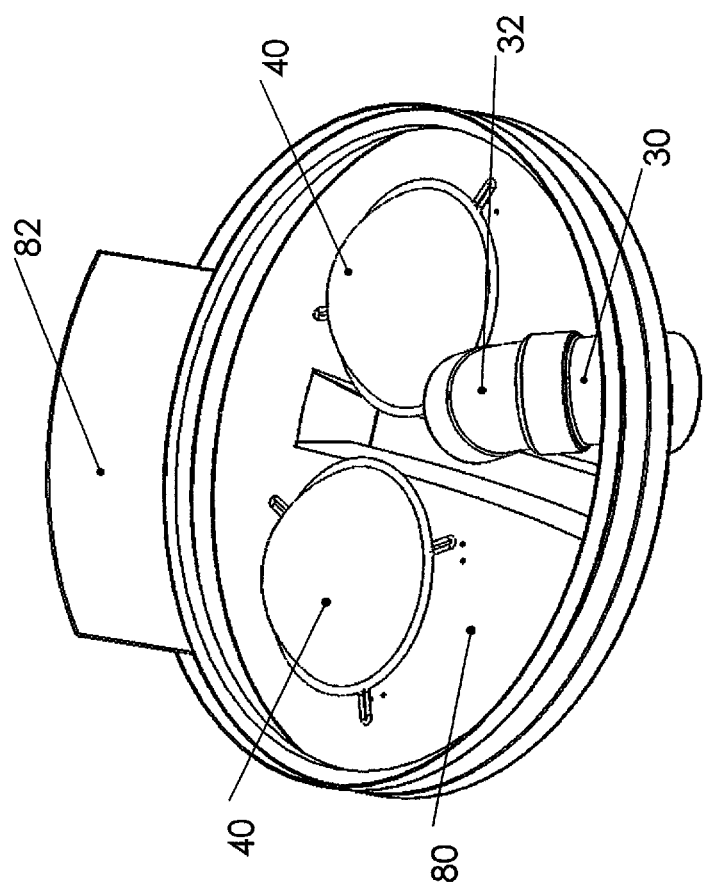
FIG. 23 shows a perspective view of the underside and the side of the fourth preferred embodiment of the debris collection system 2 of the present invention created from a type of lid sold commercially.

FIG. 23 shows a perspective view of the bottom and the side of the fourth preferred embodiment with lid 80, two strainers 40 allowing air out and retaining the debris, elbows 30 and 32 letting debris in and the protective wall 82.

Figure 24:
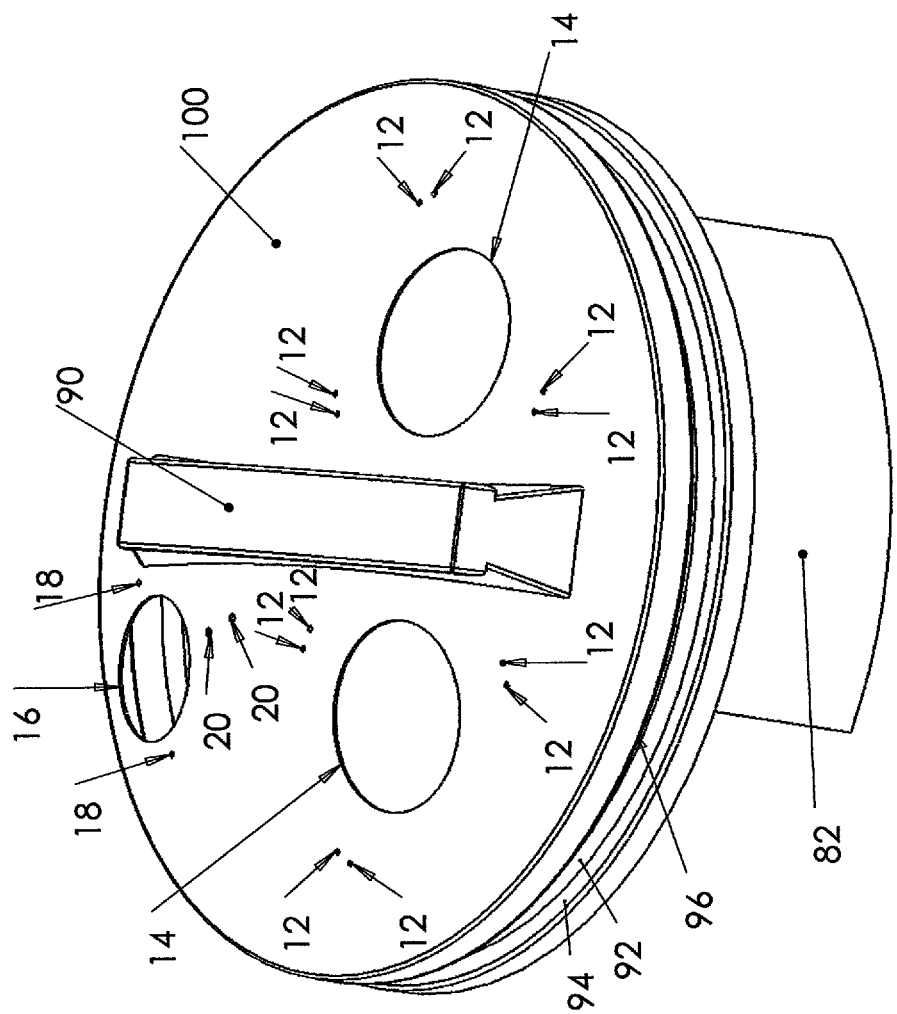
FIG. 24 shows a perspective view of a part of the fifth preferred embodiment of the debris collection system 2, particularly illustrating a lid created from a first type of lid sold commercially.

FIG. 24 shows a fifth preferred embodiment of a part of the debris collection system 2 of the present invention for a type of lid sold commercially. The fifth embodiment is similar to the fourth embodiment except that the lid 100, the opening 16, the holes 18 and 20 are to the left of the handle 90 shown in FIG. 24 and the center of the protective wall 82 is to the right of the handle 90. All other components of the debris collection system are similar to those described in the fourth embodiment. FIG. 24 also shows openings 14, holes 12 and groove 92 with its sides 94 and 96.

Figure 25:
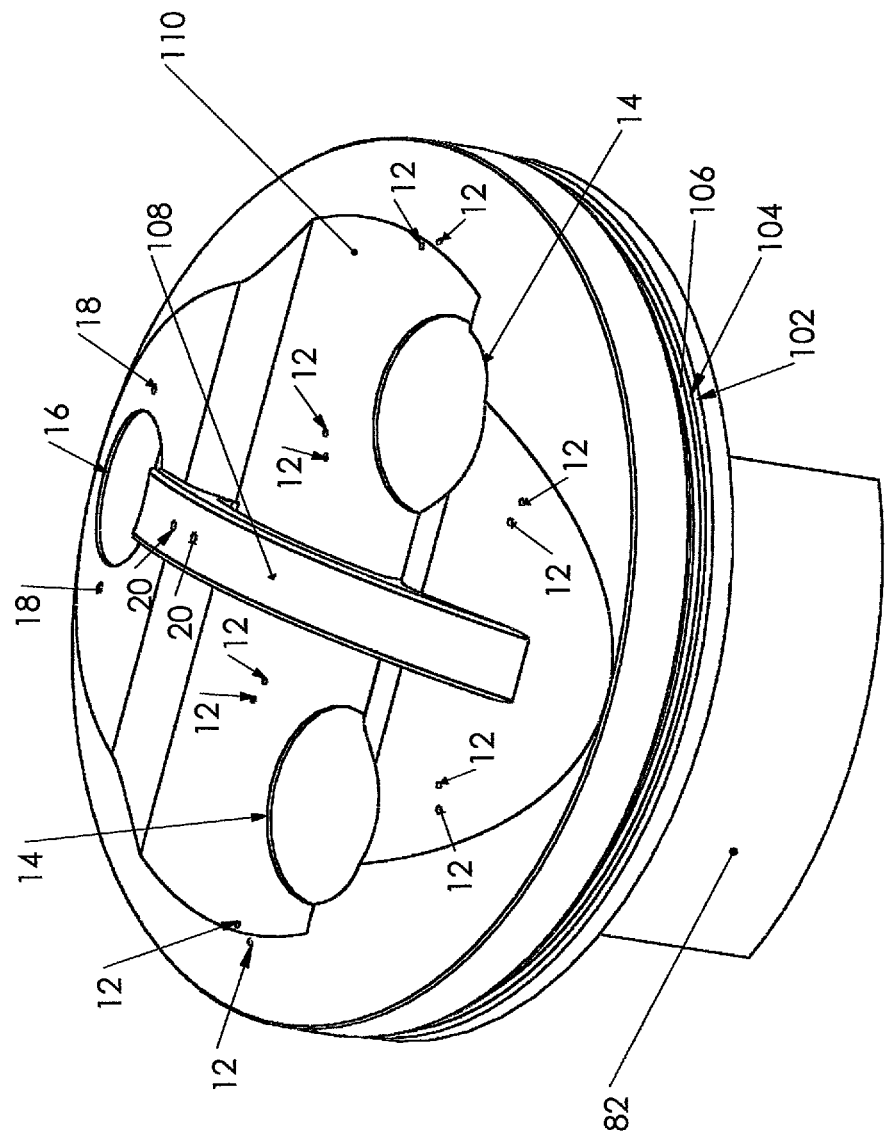
FIG. 25 is a perspective view of a part of the sixth preferred embodiment of the debris collection system 2, particularly illustrating a lid created from a second type of lid sold commercially.

FIG. 25 shows a perspective view of a sixth preferred embodiment of a part of the debris collection system with lid 110. Lid 110 (round in shape) was created under the arrangements claimed in the present invention by making changes to the original form of a type of lid sold commercially. In this arrangement, the position of openings 14 and 16 as well as holes 12, 18 and 20 is similar to the first embodiment described above (FIG. 5). The position of wall 82 is opposite to opening 16 and is central in relation to the handle 108. Groove 104 has a flat bottom and sides 102 and 106 are rounded.

Operation of the Debris Collection System

To use the debris collection system of the present invention, the operator must first install the various components of lid 10. The operator must first insert the auto-adhesive anti-skid tape into the groove 24 on the side of the lid 10. Subsequently, in the opening 14, the operator inserts the two elbows 28 or the two ribbed pipes 46 depending on the version chosen. Then the operator attaches the two strainers 40 onto the inside of the lid with the help of six cable ties 38. To do this, the operator positions the rigid ring of each strainer 40 on the inside of the lid 10 and adjusts the strainers 40 so that each of the three ears of the rigid ring of strainers are placed between the groups of two holes 12 made side by side on a concentric circle with the openings 14. The strainers 40 are then attached by passing the cable ties 38 through the two holes on each side of the ears and by closing the cable ties over the ears of the strainers 40. In the next step, the operator places the male section of the elbow 30 into the opening 16 of the outer surface of the lid 10, up to the shoulder of the elbow (the beginning of the female section). Next, inside lid 10, the operator places the female part of elbow 32 onto the male section of elbow 30 in such a way that the two elbows 30 and 32 form a 90 degree angle. Connecting the two elbows is done on both sides of lid 10 which holds them partially to the lid. The male section of elbow 32 is directed between the two strainers in the direction of the holes 20 in lid 10. Elbow 32 is attached by passing cable tie 36 through the two holes 20 in the lid 10 and by closing the cable tie through the hole in the male portion of the elbow 32. This ensures directional stability of the two elbows in order to let in debris and air. The operator then proceeds with the installation of the ribbed pipe coupling 42 on the female section of the elbow 30. To do this, one opens the ribbed pipe coupling 42 slightly and he places it over the female section of the elbow 30. By the exterior face of the lid 10, he inserts the skinny part of the two cable ties 34 into the openings 18 of lid 10 so that the head of each cable tie is a few centimeters above the lid 10. The cable tie 44-1 is then placed above the two cable ties 34 while passing under the heads of the cable ties 34. The cable tie 44-1 is then tightened against the ribbed pipe coupling 42 which bends the cable ties 34 to fit the groove of the ribbed pipe coupling 42 and at the same time adjusts the ribbed coupling pipe 42 to the female section of the elbow 30. Finally, the operator inserts another cable tie similar to the first part of the cable tie inside the lid 10, the part of 34 already inserted. He proceeds in the same way for the second cable tie 34. The excess of cable ties are removed so that they don't obstruct. The operator then installs membrane 48 by inserting ribbed pipe coupling 42 into opening 50 on the front part of membrane 48. Membrane 48 will be perpendicular to lid 10 and under bag 70 during operation of the debris collection system 2. Then the operator inserts ribbed connecting pipe 6 into ribbed pipe coupling 42. Ribbed connecting pipe 6 is inserted up to the female part of the elbow 30 so that the grooves and curves of the ribbed coupling pipe 42 and the connecting pipe 6 are superimposed one over the other, both being made of the same type of ribbed pipe. Cable tie 44-2 is placed in a groove of the ribbed pipe coupling 42 near the end and surrounds the said ribbed pipe coupling 42. The cable tie 44-2 is then clamped tightly against the ribbed pipe coupling 42, which compresses the inside of the ribbed pipe coupling 42 onto the outside of the ribbed connecting pipe 6 and thus prevents the longitudinal movement, but allows the rotational movement of the ribbed connecting pipe 6 in the ribbed pipe coupling 42. This rotational movement allows for the adjustment of the position of the lid to the ground as well as the fan outlet 8 of the blower/vacuum 7 when the operator is moving or when replacing the bag 70. The next step consists in the insertion of the ribbed connecting pipe 6 and the fan outlet 8 into the Poly Tubing coupling sleeve 60, the fan outlet 8 also enters into the ribbed connecting pipe 6 for a better hold. The two cable ties 58-1 and 58-2 are then placed around the Poly Tubing coupling sleeve 60 near the ends. Both cable ties are then tightened around the Poly Tubing coupling sleeve 60 to seal the joint and hold the ribbed connecting pipe 6 to the fan outlet 8 of the blower/vacuums. The cable tie 58-2 on the fan outlet 8 is placed behind the bulge of the fan outlet 8. The final steps are to insert the lateral part of the lid 10 into the opening of bag 70 to collect the debris and then to put the bungee cord 54 over the bag at the groove 24 in lid 10. Two hooks 56 of the bungee cord are used to connect the two ends of the bungee cord 54 and to keep tension on the walls of bag 70. In this position, the top of lid 10 is perpendicular to the walls of bag 70.

For the rest, the operator activates the Blower/vacuum 7 and starts picking up leaves or twigs. The debris and the air sucked up are thrown out by the fan outlet 8 of the blower/vacuum 7 into the ribbed connecting pipe 6 and then into the lid 10 between the two strainers 40, up to the protective wall 22 of the lid 10. From there, the debris is deflected laterally towards the bottom of the bag 70 for collection of the debris while the flow of air brought in passes through the strainers 40 and goes out of the bag 70. The fast air flow between the two strainers 40 has the effect of preventing the debris from adhering sufficiently to the domed surface of the strainers to negatively affect the air outlet. When the bag 70 begins to fill up, the operator stops the blower/vacuum 7 and compresses the debris by pressing on the sides of the bag 70 in order to put in more debris. The operator restarts the blower/vacuum 7 and continues collecting debris.

The operator can move around the field by dragging the bag on the ground without having to carry the weight of the debris. The membrane 48 below the bag facilitates the sliding of the bag 70 on the ground. When the bag 70 is full, the operator stops the blower/vacuum 7, loosens the bungee cord 54 around the lid 10 to remove the tension on the bag 70, frees the bag 70 from the lid 10 and slightly compresses the top of the bag 70 in order to have enough space to close the opening of the bag 70 with a tie or a knot. The debris remains in the collection bag 70 without having to pour it into another bag. The operator places a new bag 70 on the lid 10, restarts the blower/vacuum 7 and can proceed rapidly to the work of collecting leaves and lawns debris.

All kinds of bags can be used provided they are large enough to insert the lid 10. The type of bag can be sealed plastic or not, paper or other material.

To store the blower/vacuum, the cable tie 58-2 which goes around the fan outlet 8 is removed and the cable tie 44-2 surrounding the ribbed pipe coupling 42, which allows one to disconnect the ribbed connecting pipe 6 and the blower/vacuum 7 and lid 10. The debris collection system can then be stored in three parts, namely blower/vacuum 7, ribbed connecting pipe 6 and lid 10 with its various components.

The cable ties 58-2 and 44-2 can be provided with a release mechanism and are reusable or disposable; they must then be cut to be removed. These inexpensive cable ties are sold commercially and can be easily replaced by the operator.

We claim:

1. A debris collection system for use with a portable blower/vacuum with a fan outlet through which the debris is ejected when the blower/vacuum is used in the vacuum mode, comprising: a lid of round shape with a flat or domed top that has a first opening to allow for the entrance of debris, a second and a third opening for the air outlet, holes to attach a first and a second mesh strainer, a first and a second 45 degree elbow and a ribbed pipe coupling to the lid with cable ties and on the lateral side a 360 degree groove in a U shape with a flat bottom, parallel walls inclined toward the lid top as well as an anti-skid tape at the bottom of the groove in the U shape; a semi-flexible ribbed connecting pipe for connecting the fan outlet of the blower/vacuum in vacuum mode to the first opening of the lid; a ribbed pipe coupling to bind the ribbed connecting pipe to the lid; a flexible Poly Tubing coupling sleeve to connect the fan outlet of the blower/vacuum to the ribbed connecting pipe; a protective membrane under a debris collection bag; and a collection bag made of plastic, paper, fabric, or other material which goes over the opening by placing the bag opening around the lid.

2. The debris collection system of claim 1, wherein the lid of round shape with a flat or domed top has the first opening to allow for the entrance of debris near the edge of the lid.

3. The debris collection system of claim 2, wherein the lid of round shape with a flat or domed top has in the first opening to allow for the entrance of debris, the first 45 degree elbow of which one end is female and the other male.

4. The debris collection system of claim 3, wherein a shoulder of the female part of the first 45 degree elbow is on the outside of the lid relative to the debris collection bag and the male end is on the inside of the lid, which connects with the bag.

5. The debris collection system of claim 4, wherein the male end of the first 45 degree elbow on the inside is inserted into the female end of the second 45 degree elbow so as to form a 90 degree angle when they are one inside the other.

6. The debris collection system of claim 5, wherein the output of the male part of the second 45 degree elbow is directed towards the center of the lid.

7. The debris collection system of claim 6, wherein the male part of the second 45 degree elbow is attached to the lid by putting a cable tie through two holes on the top of the lid and the hole in the wall of the male part of the 45 degree elbow on the inside of the lid.

8. The debris collection system of claim 7, wherein one of the holes on the top of the lid coincides with the hole in the male part of the second 45 degree elbow and the other with the end of the male part of the elbow.

9. The debris collection system of claim 5, wherein a hole is made in the wall of the male part of the second 45 degree elbow located near the inside of the lid.

10. The debris collection system of claim 1, wherein the lid of round shape with a flat or domed top has the second and the third opening to let out air, each one covered on the inside of the lid by a round strainer of domed shape with at least two ears arranged on the rigid contour of the strainer.

11. The debris collection system of claim 10, wherein the ears are spaced out one from the other around the rigid circle of each strainer, but the space can vary between ears.

12. The debris collection system of claim 10, wherein the rigid side of the strainer with the ears on the inside of the lid and the domed part directed away from the inside of the lid, towards the debris collection bag.

13. The debris collection system of claim 10, wherein the strainers are attached to the lid by ears with cable ties that pass through small holes in the lid located near the rigid outer contour of the strainer and on each side of the ears placed on the rigid contour of the strainer.

14. The debris collection system of claim 13, wherein the small holes made in the lid on each side of the ears are equidistant from the center of each of the strainers.

15. The debris collection system of claim 1, wherein the lid of round shape with a flat or domed top has on the lateral contour the 360 degree groove in a U shape of which the bottom is flat and the walls of which are parallel and inclined toward the top of the lid.

16. The debris collection system of claim 15, wherein the anti-skid tape is glued to the bottom of the groove.

17. The debris collection system of claim 1, wherein the lid of round shape with a flat or domed top has an extension of the lateral contour on the opposite side of the first opening allowing for the entrance of debris.

18. The debris collection system of claim 1, wherein the fan outlet of the blower/vacuum is inserted into the semi-flexible ribbed connecting pipe and is held in place by the flexible Poly Tubing coupling sleeve made of a plastic tube covering both a part of the fan outlet and the ribbed connecting pipe.

19. The debris collection system of claim 18, wherein the fan outlet and the ribbed connecting pipe are held together by two cable ties placed transversely to the pipe and near both ends of the Poly Tubing coupling sleeve.

20. The debris collection system of claim 1, wherein the two openings on the surface of the lid for the air outlet have two 45 degree elbows of which one end is inserted into the outlet opening and the other end is oriented towards the ground.

21. The debris collection system of claim 20, wherein a 45 degree elbow is built with a female part of which the length is smaller than the male part and of which the diameter of the female part is taller than the male part.

22. The debris collection system of claim 20, wherein a 45 degree elbow is built with a male part which the length and the diameter are smaller than the female part.

23. The debris collection system of claim 22, wherein the 45 degree elbow has a swelling between the male and the female part and two holes opposed to one another in the wall of the male part.

24. The debris collection system of claim 1, wherein the two openings on the top of the lid for the air outlet have two pieces of ribbed pipe split perpendicularly to the extrusions, of which one end is inserted into the outlet opening and the other end is oriented perpendicularly to the outside surface of the lid.

25. The debris collection system of claim 1, wherein the collection bag made of plastic, paper, fabric or other material of which opening is placed around the lateral side of the lid of round shape with a flat or domed top over which a bungee cord is placed over top of the wall of the debris collection bag in the groove on the lateral side of the lid.

26. The debris collection system of claim 1, wherein a plastic membrane or other material is placed under the debris collection bag to protect the bag from the roughness of the ground, and of which the front part of the membrane has an opening in its center near the edge allowing one to insert it around the base of the ribbed pipe coupling connecting the ribbed connecting pipe to the lid.

27. The debris collection system of claim 1, wherein the lid of round shape with the flat or domed top has on the lateral side the 360 degree groove in a V shape.

28. The debris collection system of claim 1, wherein a T-shaped handle is on the top of the lid and whose center of the handle coincides with the center of the lid.

* * * * *